Figure 6:
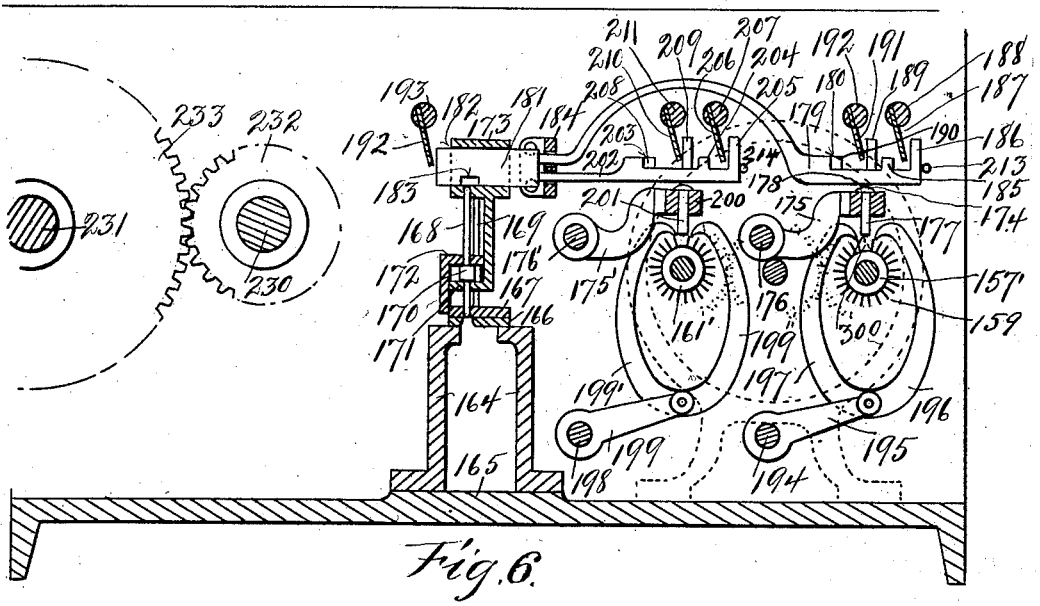

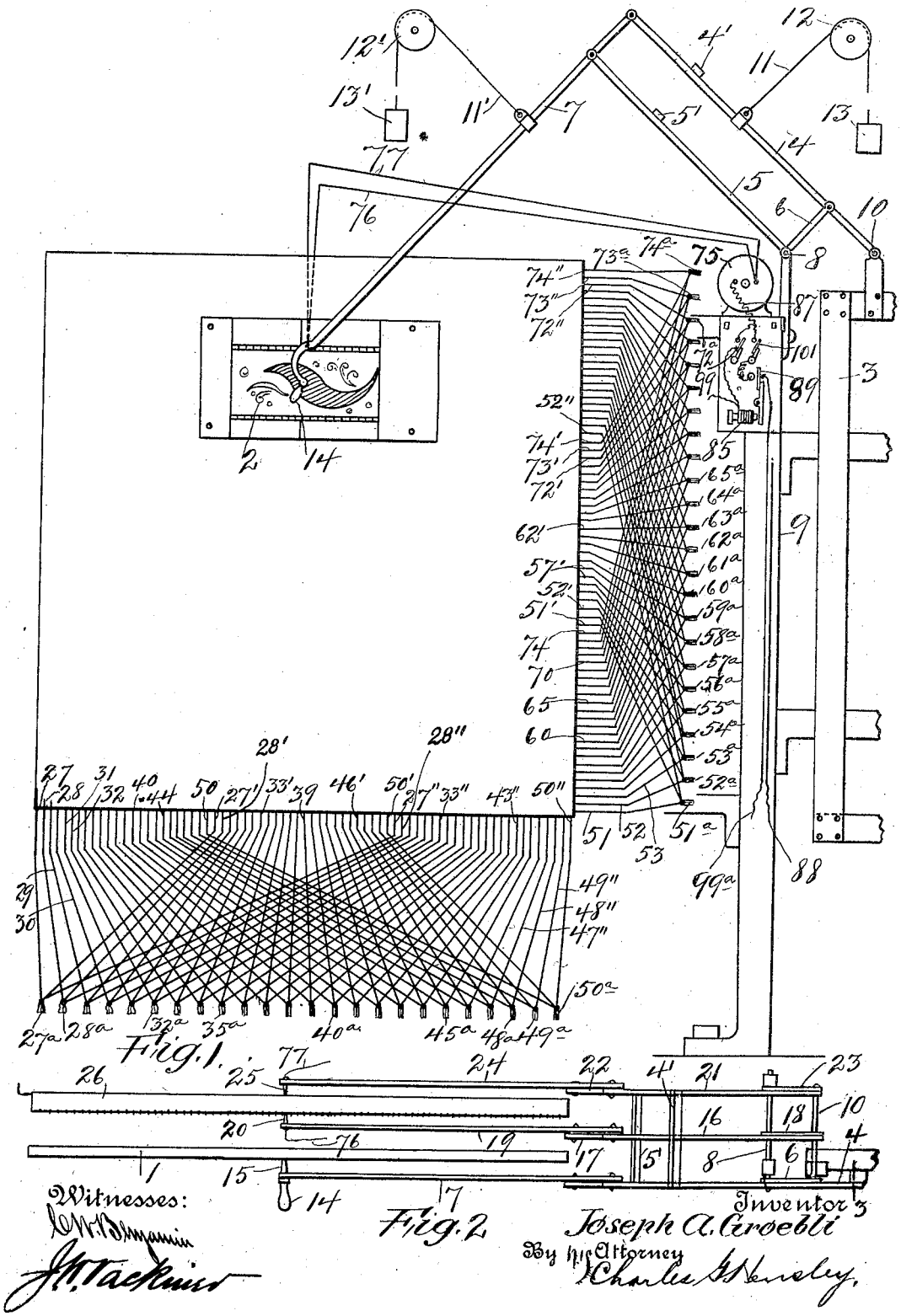

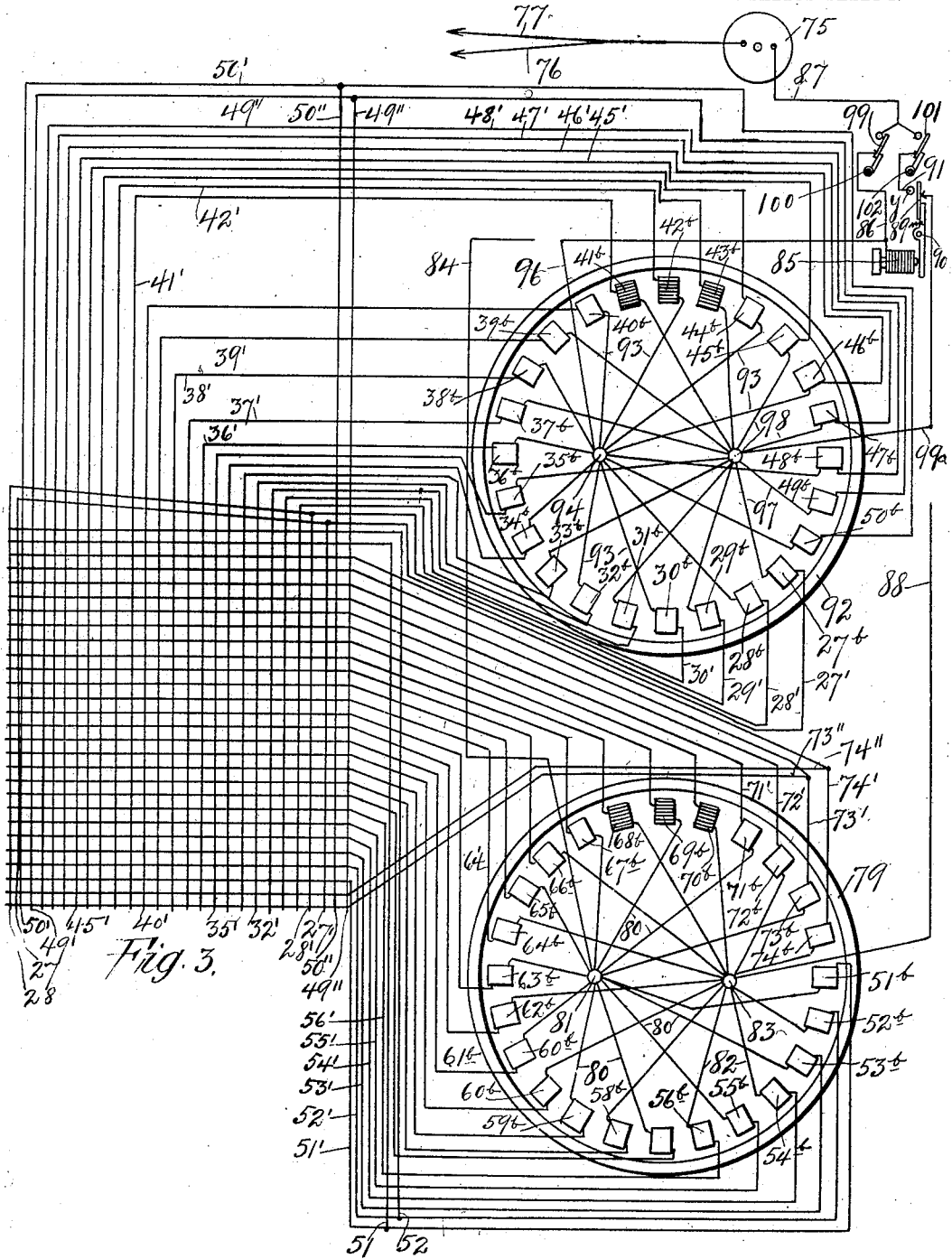

J. A. GROEBLI.
JACQUARD CARD PUNCHING MACHINE.
APPLICATION FILED JULY 11, 1911.
1,044,777.
Patented Nov. 19, 1912.
6 SHEETS—SHEET 3.
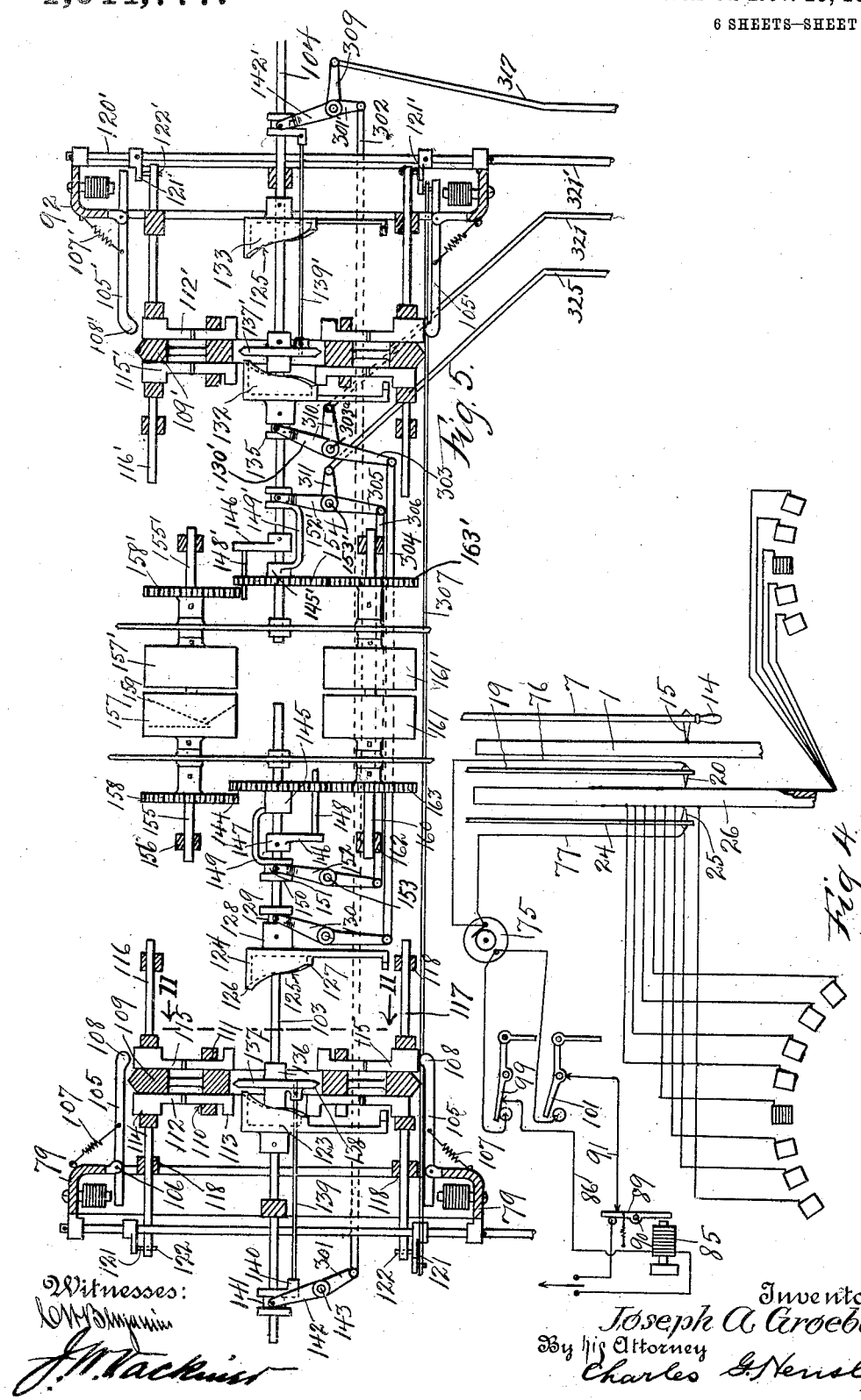
Witnesses:
Inventor
Joseph A. Groebli
By his Attorney
Charles G. Hensley

J. A. GROEBLI.
JACQUARD CARD PUNCHING MACHINE.
APPLICATION FILED JULY 11, 1911.

1,044,777.

Patented Nov. 19, 1912.

6 SHEETS—SHEET 4.

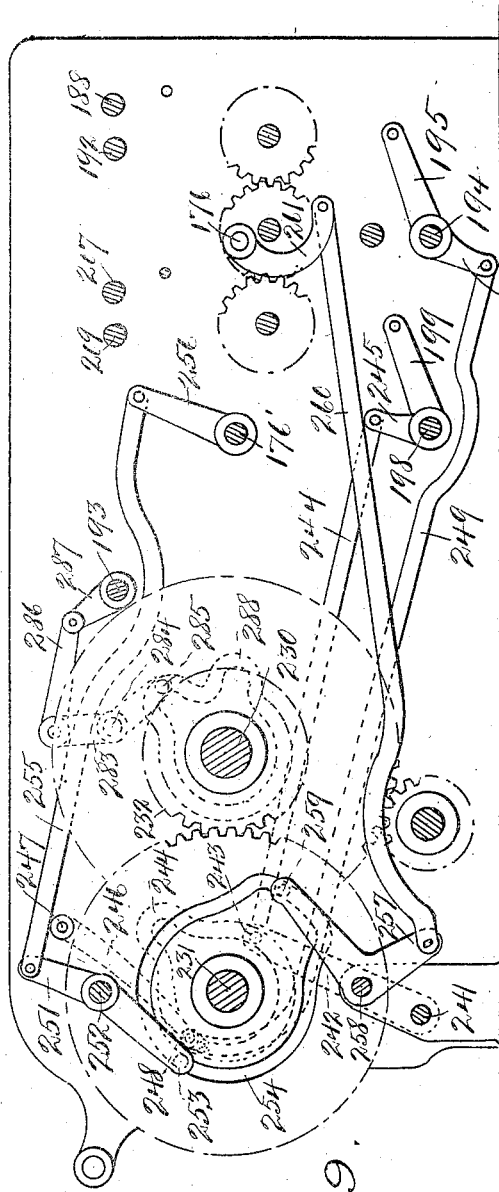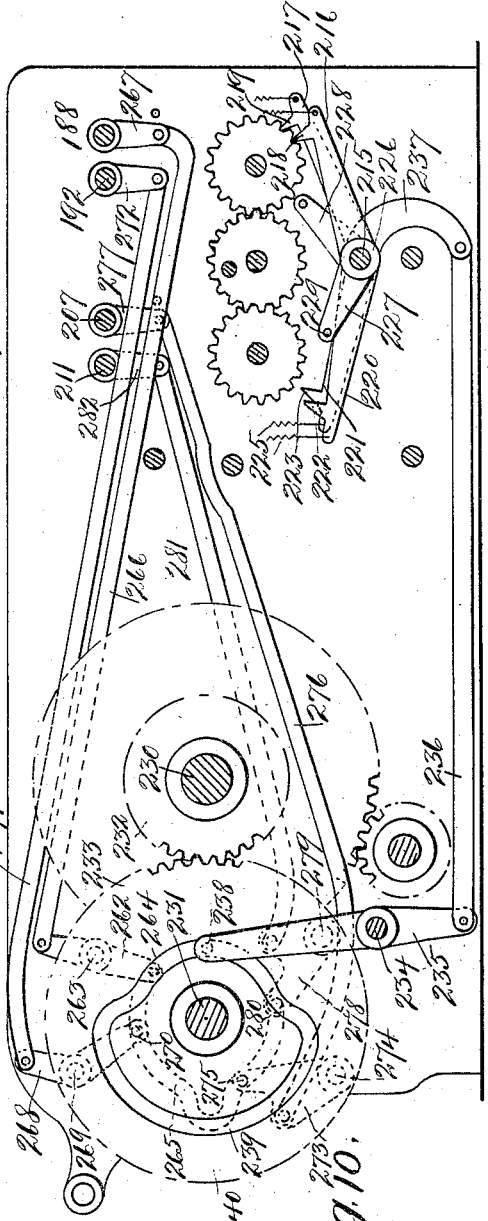

J. A. GROEBLI.
JACQUARD CARD PUNCHING MACHINE.
APPLICATION FILED JULY 11, 1911.
1,044,777.
Patented Nov. 19, 1912.
6 SHEETS—SHEET 6.
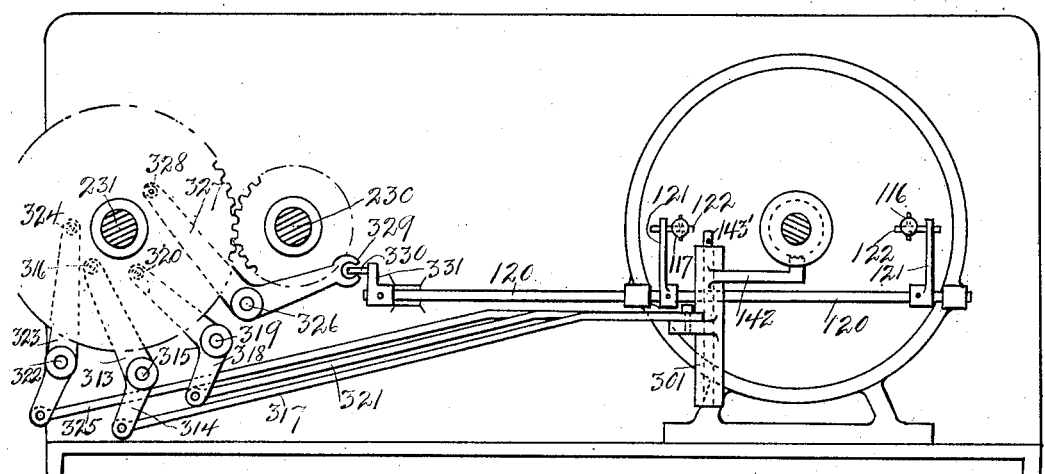
*Fig. 12.*
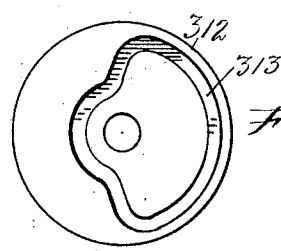
*Fig. 13.*
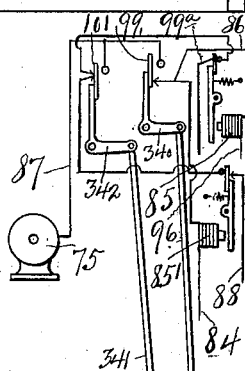
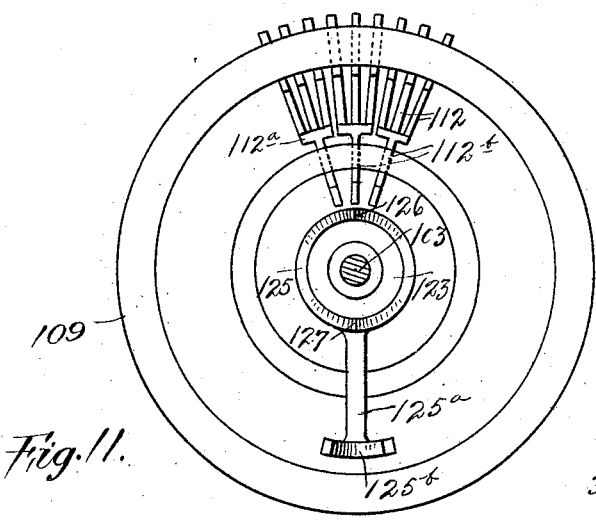
*Fig. 11.*
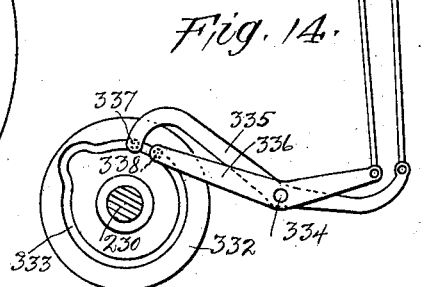
*Fig. 14.*
Witnesses:
Inventor
Joseph A. Groebli
By his Attorney
Charles G. Hensley

UNITED STATES PATENT OFFICE.

JOSEPH A. GROEBLI, OF NEW YORK, N. Y.

JACQUARD-CARD-PUNCHING MACHINE.

1,044,777.  Specification of Letters Patent.  Patented Nov. 19, 1912.

Application filed July 11, 1911. Serial No. 638,014.

*To all whom it may concern:*

Be it known that I, JOSEPH A. GROEBLI, a citizen of the United States, and a resident of the city, county, and State of New York, have invented a certain new and useful Jacquard-Card-Punching Machine, of which the following is a specification.

My invention relates to a machine for providing jacquard cards with perforations and it is more especially useful in perforating cards for use in jacquards which operate to move and control the tambour frame of embroidering machines.

In large embroidering machines the tambour frame is moved after each stitching operation, whereby the length and disposition of the stitches will be determined; and the principal function of an embroidering machine jacquard or automat, is to cause the various movements of the embroidering machine tambour frame. So far jacquards for such purpose have been made on what is called a unit system. That is, a system by which various units of motion are combined to produce resulting movements of the tambour frame of the embroidering machine. By providing a jacquard card with perforations, differing in their relative locations, the jacquard card is adapted to effect the selection of various slides in the jacquard, which determine the extent and direction of movement of the tambour frame of the embroidering machine. The perforations in the card are produced generally by selecting various perforating elements, each of which is arranged to perforate the card in a definite location; and the positions of the perforations are determined by the selection of the particular perforating elements. In such machines the jacquard card is usually provided with transverse rows of perforations, each row representing one movement of the tambour frame of the embroidering machine.

The perforations may be made in a row or in the arc of a circle. My present invention may be utilized for perforating jacquard cards in either way but inasmuch as I consider the first form preferable, I shall describe my invention as embodied in a machine for perforating jacquard cards of the first form, not intending however, to limit my invention to such embodiment.

In my U. S. Letters Patent No. 551544 and 627256, and dated December 17, 1895,— June 20, 1899, I showed and described a machine for perforating jacquard cards, which has proven very successful for that purpose. However, in that construction I employed two independently slidable frames having bars crossing each other, with a pointer which was always held at the point of juncture of the said cross bars: and by moving said frames in either direction and varying extents the pointer was made to follow the design held upon a supporting board. Each time the pointer was positioned the punching mechanism was adjusted thereby, and perforations were made in the jacquard card representing the movement of the pointer; and this movement was afterward translated by the jacquard, in which such card was used, upon the embroidering machine tambour frame. While that structure was accurate in its work, nevertheless I have found that, the positioning of the pointer for each stitch being caused by the resultant of the movements of the two frames above mentioned, the operation of positioning the pointer for each stitch had its limitations as to speed.

The object of the present invention is to produce a machine which can be operated at much greater speed so that the output of the machine is materially greater and the work of the operator is increased. This is accomplished through a mechanism which, considering the requirements thereof, is comparatively simple and accurate.

I accomplish the above objects in a machine which embodies a complete new organism, some of the branches of which may be used independently of the others, for their individual advantages, but the machine as a whole is adapted to produce highly satisfactory results.

The object of the present invention as above stated, is to increase the speed at which the machine may be operated. One of the principal factors in accomplishing this result consists broadly, in utilizing an element in the nature of a pointer to be moved to various positions over a design suitably mounted to guide the operator, which pointing device is adapted to have a universal movement at least in one plane so that it can be quickly moved over the pattern without considering the resultant of two combined movements. And in conjunction therewith I provide various elements having definite locations with which the movable pointing device is adapted to coöperate, and by a selection of the various definitely located elements, determine the particular perforation to be made by the punching mechanism preferably through perforating elements having definite locations relative to the jacquard card. I preferably employ two distinct sets of elements by which the pointing device selects from each, representing movements of different directions. Preferably one set represents movements of the pointer in a vertical direction and the other in a horizontal direction, each of which sets, are preferably arranged in right angle relation to each other. By a selection from one of said sets of elements a perforation is caused in the jacquard card representing a stitch to be made in one direction; while by a selection from that of the other set, perforations are made representing a stitch to be made in another direction, and preferably at right angles to the first one; while by a selection from both of said sets, perforations are formed, representing a stitch to be made in a direction corresponding with the resultant of two directional movements. In this manner I am able to produce perforations in a card, which, when used in a jacquard, will cause movements of the tambour frame in any direction in its plane of movement. Furthermore, the various elements of the two sets above referred to represent different units of movement to be produced upon the tambour frame by the jacquard, so that in moving the pointing device from any given position to any other position not only is the direction of such movement recorded through the particular stationary elements selected by the pointing device, but also the extent thereof. It will be apparent therefore, that the broad object of my present invention is somewhat analogous to that of my said patent, but the results are obtained in a much different way.

By having various stationary elements which are selected by the movement of a pointing device which is itself universally movable, it is very easy to position the pointing device for each punching operation, and the operator can operate the machine much faster.

While it is possible to embody my invention in a machine which is wholly mechanical, nevertheless I prefer to embody the invention in a machine which is partly electrical and partly mechanical, I also prefer to employ a machine which will be continuous in its operation, that is, in which one punching operation will follow immediately after another without requiring an operation by the operator to initiate each punching operation. This is of advantage in the present machine because the operator is enabled to position the perforating mechanism much more rapidly than heretofore.

Besides the important advance made by the mechanism for selecting the perforating elements, my invention embodies many other features extending throughout the entire machine, many of which are independently usable, but which also coöperate in the present structure to produce a most satisfactory result. For instance, in my said patent the movement of the sliding frames which operate the pointer, operates through gears to move pin drums, by which the selection of the punching elements is accomplished. In the present instance, however, the pointing device selects from elements which have stationary positions, but which themselves select certain movable elements and through the latter movements of varying extent are produced in the pin drums, and preferably through a very novel slide and cam mechanism.

In embodying my invention in a concrete structure, I have provided a pointing device to be moved in relation to a pattern which is held upon a suitable support. In addition I have provided a support to which are attached a number of wires forming parts of electrical circuits, which wires, I have arranged in close proximity to each other, say $\frac{1}{16}$ of an inch apart. The wires of one set are arranged parallel with each other, say in a vertical direction: while those of the other set of wires, also forming parts of electrical circuits, are also placed close to each other, say $\frac{1}{16}$ of an inch apart and parallel to each other and in a horizontal direction. While the two sets of wires may lie in separated planes, those planes are preferably parallel, while the two sets of wires will be disposed preferably at right angles to each other. By closing contacts with these wires, which is done by the operator in moving the pointer from one position to another, a selection is made from the punching elements, and perforations are made in the jacquard card representing the direction and extent of movement of the pointing device. The perforations caused by one set of wires will be translated by the jacquard into a corresponding movement in one direction, and the perforations caused by the other set will be translated into movements of a different direction, and through mechanism capable of producing a movement which is the resultant of both, the tambour frame of the embroidering machine will be operated. It may be here stated that in U. S. Letters Patent dated November 6, 1894, and numbered 528632 I showed and described a jacquard capable of producing such results, for which jacquard my present machine is capable of making jacquard cards. Juxtaposed wires of each set represent units of movement, but it is not necessary to have as many selectors of motion as there are wires in a set, running over the whole device, because I will show how a limited number of selectors may be so connected with the various wires of a set that the units employed may be made to correspond with the particular jacquard for which the card is to be used, regardless of the number of wires in a set and the size of the pattern, and its support.

In some branches of my invention I employ duplicate sets of mechanism, which perform functions similar to each other, but in alternate relation, so that the desired speed of operation of the machine may be obtained.

In describing a structure embodying my invention it will be necessary for a proper understanding of my invention to refer to the number of parts, but it is intended in no way to limit my invention to a structure embodying any given number of parts nor to a structure in which the parts bear a relative numerical order. On the contrary, it will be apparent from an understanding of my invention that it embodies many broad principles, and inasmuch as I consider my present invention as of a pioneer character, I desire that the present Letters Patent be interpreted as having a scope corresponding therewith.

A complete structure embodying my invention in what I now believe to be the best form, will be hereinafter described in detail.

Figure 7:
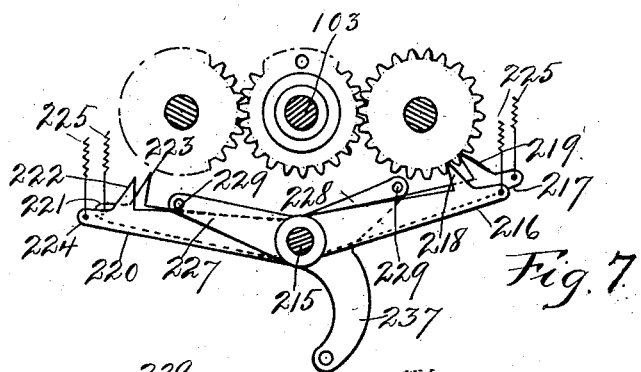
Figure 8:
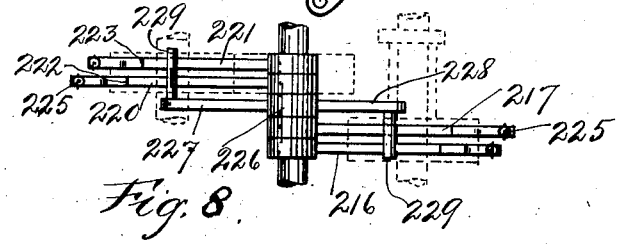

In the drawings forming a part of this application Figure 1, is an elevation showing the pointing and selecting branches of my invention, as well as the pantograph, Fig. 2, is a plan view thereof, Fig. 3, is a diagrammatic view showing the wiring to and from the magnets, Fig. 4, is a side elevation of the pointing device with parts of the wiring shown diagrammatically. Fig. 5, is a horizontal sectional view, looking downwardly and showing the arrangements of magnets, armatures, selecting slides, cams and shafts, as well as the pin drums, which perform various functions in relation to the selection of the perforating elements. Fig. 6, is a vertical section showing the devices for selecting and locking the punching elements, Fig. 7, is a vertical section showing the locking mechanism for locking the pin drums, Fig. 8, is a plan view of parts of the devices shown in Fig. 7. Fig. 9, is a vertical sectional view showing various cam and lever actions for operating the mechanisms shown in Figs. 6 to 8, Fig. 10, is a similar view showing the devices for operating the mechanisms shown in Figs. 6, 7, and 8. Fig. 11, is a sectional view taken on the line 11—11 of Fig. 5. Fig. 12, is a sectional view showing devices for shifting various devices, and Fig. 13, is a face view of the cams used to operate the devices as shown in Fig. 12. Fig. 14, is a detail view showing the periodical circuit closers, and their effect on the circuits.

In taking up the description of my invention I will first describe the mechanism by which the punching elements are selected by the operator and then proceed with a description of the punching mechanism itself.

In Figs. 1, 2, and 4, I have shown the pointing and associated mechanisms and in Fig. 3, I have shown a system of electrical circuits and magnets which effect the selection of the punching elements.

I have shown an upright board 1, as a suitable support for a copy of the design 2, on paper, or other form so that the operator can follow the design with the pointer; and the only purpose I have shown this board used for is the proper supporting of the design. The design 2, placed on this board, represents the embroidered figures which are to be produced by the sewing needles of the embroidering machine as a result of the movements of the tambour frame, as effected by the jacquard. I have associated the pointer with a pantograph frame and the latter operates a tambour frame. I have shown in Fig. 1, the end of a tambour frame 3, which may be the tambour frame of a large embroidering machine, the mounting and counterbalancing of which are well known in the art and need no explanation here. This tambour frame is, however, preferably associated with a small machine having a limited number of needles which will simply produce the design upon a fabric, similar to the machine for that purpose shown in my Patent No. 627,256 the object being the same, to wit, the production of the actual design by a sewing needle or needles, in conjunction with the operation of the punching machine, so that the work of the latter may be followed by the work simultaneously produced by the stitching machine.

I have shown a pantograph, consisting of the arms 4, and 5, connected by the link 6, at one end, and a link 7, at the other, by which latter the pantograph is operated. The pantograph frame fulcrums at 8, from extensions of the standards 9, of which there are preferably two on the embroidering machine frame: and the arm 4, is fulcrumed at 10, to a part of the tambour frame 3. A movement of the arm 7, in any direction of its plane of movement, will cause a corresponding movement, on a reduced scale, in the tambour frame 3, and therefore the needles of the embroidering machine will produce the embroidered design upon the fabric carried by the tambour frame, as will be readily understood. I preferably employ two ropes 11, 11', attached to the pantograph and extending around pulleys 12, 12', and provided with a weight 13, 13' for counterbalancing the weight of the pantograph.

The arm 7, is provided with a handle 14, by which the operator manipulates the pantograph and operates the pointing mechanism of the punching machine. The arm 7, also carries a pointer 15, by which the operator is able to guide the movements of the pantograph and the punching mechanism and the pointer is arranged to move in juxtaposition to the pattern 2.

Behind the arms 4, and 5, I have arranged the arms 16, and 17, which are parallel to the former and are fulcrumed to the same pin 8; are connected by a link 18, corresponding with link 6, and their forward ends are connected by an arm 19, which is preferably parallel to, and of the same length as the pantograph arm 7. The arm 19, is provided with a contact pin 20, which makes electrical contact with the various wires forming connections with the controlling magnets which will be more fully described hereinafter. Connected with the same pin 8, and preferably parallel to the arms 4 and 16, and 5 and 17, are arms 21, 22, which are connected to each other by a link 23, similar to links 6 and 18. The other ends of the arms 21, 22, are connected by the arm 24, which is preferably parallel to, and of the same length as the arms 7, and 9; and this arm also has a contact pin 25, which makes contact with the elements of electrical circuits connected with other electromagnets. The arms 4, 16 and 21, are connected firmly by a bar 4, and the bars 5, 17, 22, by a bar 5. The entire system of pantograph levers being joined together in such a way that any movement of the pointer 14, will be accurately followed by the tracers 23 and 25. It will be apparent that with the above arrangement of parts the arms 7, 9, and 24, will be moved together whenever the operator manipulates the former one. By arranging the parts as herein shown, the pins 20, and 25, will lie directly in line with the pointer 15, and they will make contact with their respective contact wires in accordance with the movements of the pointer, and therefore in accordance with the configuration of the design.

While broadly considered the pointing device may be mounted in various ways so long as it has the desired movement, nevertheless I prefer to employ a pantograph frame as part of and to be moved by the pointing device, for the purpose of utilizing the movements of the pointer to operate simultaneously the tambour frame of an embroidering machine. By so doing the pattern may be simultaneously worked on a fabric by a stitching mechanism, and the nature and correctness of the pattern card being made by the punching machine may be judged by the work being produced by the stitching mechanism.

I have arranged in an upright position, and preferably between the arms 19, and 24, and preferably parallel with the pattern board 1, another board 26, which supports the contact elements with which the contact pins 20, and 25 coöperate to cause the selection and operation of the punching elements. This support may be in the nature of a wooden board, its principal function being to support the contact elements. It is upon this support that I have arranged the elements which have definite positions and from which the selection is made by the pointing mechanism for the purpose of determining the perforations which are to be made by the punching mechanism, and in the structure herein shown these elements consist of electric wires arranged in a novel and convenient scheme for carrying out my object. These contact elements are preferably arranged in the following order. I have arranged a number of wires in vertical positions on one side of the support 26, which preferably are parallel to each other and which are preferably very close to each other, say $\frac{1}{16}$ of an inch apart, and arranged over a space on the support equal to the largest pattern likely to be placed on the board 1. They may be coextensive with the width of the board 1. These wires are simply set into one face of the support so that they project sufficiently beyond the surface thereof to permit the contact pin 20, to make contact at any place throughout the dimension of the support. These wires represent units of movement to be imparted to the embroidering machine tambour frame by the jacquard, inasmuch as they are adapted to cause selection of punching elements which cause different perforations in the jacquard card. In making a selection from said wires the pointing device is of course moved different units in extent, which movements correspond with the movements to be produced by the jacquard when the perforated card is utilized therein. In a jacquard wherein a number of different units of movement are required to execute the necessary movement of the fabric frame a considerable number of separate selectors are needed, but not nearly as many as the number of wires which would be likely to be used on the support 26, where such wires are placed very close, as they must necessarily be in order to obtain the desired results. I have therefore arranged the wires which are juxtaposed to each other to represent units of movement, but progressing in regular order, and repeat the arrangement of a predetermined number as many times as may be necessary to have the wires cover the desired working space, which is preferably the size of the board 26.

It will be necessary in order to teach the principles of my invention to refer to numbers, but this is only to show an instance of an embodiment of my invention. Let it be assumed that the vertical wires represent horizontal movements of a different number of units in extent for the pointer, which, in moving from contact with one of these wires to another, moves in a generally horizontal direction. Let it be assumed that the machine under consideration is to perforate cards for use in a jacquard in which eleven different extents of motion of a given kind, say horizontal, can be arranged. Then there will be twenty four of the vertical wires arranged parallel and close to each other, each representing units of motion. Taking the arrangement shown herein, and starting from the left in Fig. 1, wire 27, will represent one unit of motion and will affect a certain selector; 28, will represent the other unit of motion and will make another selection; and so on to wire 50, which will represent the last of a group of twenty four units. Where the wires are arranged close together and are arranged to represent say twenty four units of motion, they will not extend over the desired space, so I repeat the arrangement by providing wires 27' to 50' in which 27' represents the same selector as wire 27; 28', the same as 28; and so on, throughout, to wire 50'. If this is not sufficient to cover the desired area I repeat the arrangement by providing wires 27'' to 50'' parallel to the previous ones; 27'' will represent the same selector as wire 27, and wire 27'; and 28''; and the same as 28, and 28'; so on to wire 50''. If necessary this is repeated until the desired space is covered by the wires. In referring to these wires as representing units of motion I mean that they determine the positions of the different perforations to be made in the jacquard card, and that the positions of such perforations determine the number of units, or, in other words, the extent of the movement which the jacquard will effect on the embroidering machine tambour frame.

Assuming that the jacquard will produce eleven movements of different extents in the tambour frame either way in the horizontal direction when as a matter of fact, I prefer to employ twenty four different wires in each group, of the twenty four wires in a group, one (any one) may be considered as the point from which the contact pin starts in moving in any given direction and eleven wires represent eleven units of movement in one direction from which the pin starts and eleven represent eleven units of movement in the opposite direction therefrom, making in all twenty three wires. There will therefore, if the present arrangement is followed in its details be at least one extra wire, but this will not change the result since there is no fixed starting point for any movement. The starting point shifts for every operation of the machine. I prefer to provide this additional wire, in order that there will be an even number in each group of wires in order that the wires from the magnets may be evenly separated to accomplish the desired results in connection with the mechanism for preventing the operation or more than one horizontal unit being operated at a time, as will appear in the subsequent description.

Since similar wires of the different groups in the vertical set represent similar selectors it is preferable to join them in order to simplify the wiring through the machine. I have therefore brought the various vertical wires together in twenty four bunches below the support 26, which bunches are numbered from 27ª, to 50ª respectively. Bunch 27ª, consists of wires 27, 27' and 27'' connected together; 28ª, consists of 28, 28', and 28'', connected together; and so on to bunch 50ª which consists of wires 50, 50' and 50'' connected together. From here on the bunches themselves only need to be connected, as will appear. There will therefore be as many bunches as there are selectors: and in each bunch there will be as many wires connected as there are wires representing similar selectors. These bunches will be traced further, later in the description. It has been said that there are also wires horizontally arranged and these are disconnected from the vertical wires. The horizontal wires are preferably grouped and bunched similar to the vertical wires, and they represent say vertical units of motion since the pointing device in moving from contact with one to the other, moves in a generally vertical direction. I have arranged a number of wires horizontally on the support 26, preferably about $\frac{1}{16}$ of an inch apart. I prefer to arrange the horizontal wires on the opposite side of the support, to the vertical wires, as shown in Fig. 2, and to place them that they will project slightly from the surface of the support. The pin 25, makes contact with the horizontal wires.

I have shown wires 51, to 74, arranged horizontally parallel with and close to each other, and each of these represents a unit of motion, the same as the vertical wires. In a machine for perforating cards for a jacquard having units of motion there will be the twenty four wires 51, to 74. Since these wires when arranged very close to each other, would not extend over a sufficient area for a large design I prefer to provide a duplicate group which I have numbered from 51' to 74", arranged to follow after the first group, and in the same order, the wire 51' representing the same unit as wire 51, 52' same as 52 and so on. I have shown a third group numbered from 51" to 74" arranged after the second group and in the same order. This may be repeated as many times as desired and the number of groups of vertical and horizontal wires need not necessarily be the same. These various wires of the horizontal sets are preferably bunched similar to the vertical wires, the wires representing similar selectors being brought into similar bunches. Wires 51, 51' and 51" for instance, are brought together as bunch 51$^a$, 52, 52' and 52" as bunch 52$^a$ and so on, until they are brought into twenty four bunches, each bunch now representing a different selector the same as the individual wires in those bunches.

In referring to the wires as horizontal and vertical, in the above description, I do not mean that such directions are imperative but I have used those terms to distinguish the two sets. They may both be arranged diagonally if necessary, so long as their lines cross. It is not necessary that they cross at right angles but I have shown them as crossing at right angles, because the machine is to perforate cards for use in such jacquards as are now in general use. The number of wires may be changed, and the number of groups and the number of units represented in each group, according to requirement, but I have shown three groups in each set in order to illustrate the manner of combining the various wires in order to produe the novel result intended.

I have shown a generator 75, mounted on the standard 9, which generates an electrical current for the various electrical circuits of the machine. A wire 76, leads from one brush of the generator to the contact pin 20, of the pointing device, whereby the pin may close a circuit through any of the vertical wires on the support 26; and another wire 77, runs from the same brush of the generator and connects with the contact pin 25, of the pointing device, whereby the pointing device may close a circuit through any of the horizontal wires. The wire 87, from the opposite brush of the generator will be traced in the subsequent description.

When an electrical contact is made by either or both of the pins 20 or 25, an electric circuit or circuits is thereby formed and these electrical forces are preferably transformed into mechanical force through the instrumentality of electromagnets for the purpose of furnishing the force for selecting the various punching elements of the machine. I provide a group of electromagnets to be individually operated by the wires of the vertical set above referred to: and a separate group of electromagnets to be individually operated from the wires of the horizontal set above referred to, in order that the directional movements represented by the two sets of wires may be kept separate and be represented on the jacquard card by perforations having their respective locations thereon. The perforations representing the vertical movement may occupy one half the card, while the horizontal ones may occupy the other half of the transverse row.

In Fig. 3, I have shown, diagrammatically, the various connections with the electromagnets, in which the bunching of the wires is so laid out that the different wires may be traced to their various magnets. The electromagnets are here shown merely diagrammatically, as their mechanical operations will be understood from other views of the drawings. I have shown a number of electromagnets mounted upon an annular ring 79, which latter merely supports the magnets in position to perform their mechanical functions; and in this ring there should be no magnetic flux to destroy the individual action of the several magnets. The several magnets on this ring are preferably mounted with their cores arranged radially, and the mechanical action of the magnets will be treated of later in the description.

On the ring 79, I have arranged magnets of a number corresponding approximately to the various motions represented by the perforations to be made on the card. I have therefore in the present instance shown twenty four magnets arranged on the ring 79, which are numbered from 51$^b$ to 74$^b$. The horizontal wires shown in Fig. 1, are connected with these magnets so that only wires representing similar positions in the various groups are connected with similar magnets. The wire 51, for instance, is connected with magnet 51$^b$, 52, is connected with magnet 52$^b$, next to it, and so on until wire 74, is connected with magnet 74$^b$ (preferably through a portion of wire 71'), thus connecting each wire representing a position in the group with one of the magnets. Since there are several groups of the horizontal wires each of which has wires representing the twenty four positions they may be connected with the same magnets. Wire 51' therefore of the second group, is connected with the same magnet 51$^b$ that wire 51, is connected to; wire 52' to the same magnet 52$^b$, that wire 52, is connected to; and so on through the group. In like manner wire 51", of the third group is connected to the same magnet 51$^b$, that wires 51, and 51' are connected to: 52" to the same magnet 52$^b$ to which the wires 52, and 52' are connected: and so on throughout the group. This same arrangement may be carried out no matter how many different groups there may be of the horizontal wires. The above is a consideration of the wires individually. Considering them as bunched near the support 26, bunch 51$^a$ runs to magnet 51$^b$, 52$^a$, to 52$^b$ and so on throughout.

Since the wires on the support 26, are very close to each other, the pin 20, which must be broad enough not to miss a wire in any positioning is liable to simultaneously contact with two of the vertical wires and likewise the pin 25, with two of the horizontal wires and I have provided means whereby no conflict will result therefrom, but the unit represented by one of the wires so contacted with by their contact pin will actuate its respective selecting element. I have shown connections to each of the magnets on ring 79. The connections coming from the same are as follows. I have run a wire 80, from each alternate magnet, to a point 81, where they are bunched so that there will be twelve wires running to bunch 81, and they are here shown as running from magnets 52$^b$, 54$^b$, 56$^b$, 58$^b$, 60$^b$, 62$^b$, 64$^b$, 66$^b$, 68$^b$, 70$^b$, 72$^b$, and 74$^b$. From the magnets alternating with the above, such as 51$^b$, etc., I have run wires 82, to a bunch 83. Thus the circuits will be separated in coming from the magnets, so that magnets connected with the circuits of wires of the board 26, which lie next to each other will be brought out of the magnets separately. Thus the bunch 81, represent wires of the horizontal set which are spaced two wires apart, and bunch 83, represents wires spaced two wires apart and alternating with those represented in bunch 81. From the bunch 81, a wire 84, carries the circuit to an electromagnet 85, from whence it is carried by a wire 86, to a mechanical circuit closer and from there through a wire 87, back to the opposite brush of the generator to which the wire 77, is connected. From the bunch 83, a wire 88, carries this branch of the circuit to an armature 89, on an arm which fulcrums at 90, and which armature is subject to the action of the electromagnet 85. From the armature 89, which normally contacts with the post Y the circuit is by wire 91, to another mechanical circuit closer and from thence by wire 87, to one brush of the generator. Thus the circuits of the horizontal wires are completed through different magnets and adjoining circuits are separated. A similar arrangement is provided for the vertical wires. A ring 92, forms a support for twenty four radially disposed magnets, but allows no magnetic flux between the magnets. Wire 27, runs to magnet 27$^b$, of this group, wire 28, to magnet 28$^b$, and so on wire 50 running to magnet 50$^b$. Since wires 27' and 27'' are bunched with wire 27, they also run to magnet 27$^b$, and wires 28 28' and 28'' to magnet 28$^b$, etc., throughout. From every alternate magnet of the ring 92, a wire 93, carries the circuit to a point 94, where all wires 93, are bunched; and from there the circuit is carried by a wire 96, to a magnet 85 and from there it goes to the circuit closer and to the generator. From each magnet on ring 92, alternating with those to which wires 93, are connected, I run wires 97, to a point 98, where they are bunched; and from there the circuit is carried by a wire 99, which connects with an armature 89 and from there it goes to the mechanical circuit closer and to the generator. Thus the circuits of the vertical wires are connected through their respective magnets and magnets connected with adjoining wires are separated.

The mechanical circuit breakers are operated for the purpose of preventing conflict when adjoining wires in either set are simultaneously contacted with by the contact pins. The circuit breaker 99, is rocked on a stud 100 for the purpose of making and breaking the circuit between wires 86, and 87, and it is mechanically operated, preferably from the shaft of the punching machine through the elements described hereinafter.

The circuit breaker 101 fulcrums on a stud 102, and is adapted to make and break the circuit between the wires 88, and 87. It will be noted that the breaker 99, breaks the circuit coming from bunches 81, and 94, while breaker 101 breaks the circuits coming from bunches 83, and 98, while the circuits from one group (83, 98) is also broken by the electromagnets 85, and 85' which are controlled by the other circuits.

So far it has been shown how electrical circuits may be selected and closed through two sets of magnets which represent different motions of different directions.

In Fig. 14, I have shown the means for automatically closing the circuit closers 99, and 101. On the main shaft 230, I have arranged a cam 332, having a cam groove 333. On a shaft 334, I have fulcrumed two levers, 335, and 336, whose bowls 337, and 338, travel in the cam groove 333, the first bowl slightly in advance of the other, so that levers 335, and 336, will be rocked one ahead of the other. The lever 335, is connected by a link 339, with the first circuit making lever 340, while the lever 336, is connected by a link 341, with the second circuit closing lever 342. Through these devices the circuit closers 99, and 101 are automatically operated at each operation of the machine, one slightly in advance of the other.

I now proceed to the mechanical devices for performing punching operations in response to the control of the electrical circuits and magnets.

I preferably arrange the magnet rings 79, and 92, on opposite sides of punch selecting mechanism as shown in Fig. 5. I have arranged various elements of the mechanism in duplicate and so that the duplicate devices operate alternately in order that the machine may be operated rapidly. I have provided longitudinal shafts 103, 104, (see Fig. 5,) which I have arranged in diametrical alinement, and these shafts are both revoluble and reciprocable and independently of each other. Near the opposite ends of these shafts I have mounted the magnet rings 79, and 92. For each magnet on these rings 79, 92, there is an armature lever 105, which fulcrums on pins 106, arranged around the rings. These levers are arranged to be swung by their respective magnets for the purpose of operating certain slides, and springs 107 tend to lift the forward ends 108 of the levers, which springs may be overcome by the magnets.

I have provided annular supporting frames 109, which have a number of radially arranged slots 110, corresponding to the number of magnets of the rings, on one side and an equal number of slots 111, on the opposite side, which slots 110, and 111, I have arranged in line with each other. In each slot 110 I provide a reciprocable slide 112, which has lateral projections 113, 114, at the ends which engage the frame 109, and limit the reciprocating movement of the slides. In slots 111, I have arranged similar slides 115, having similar lateral projections 113, 114, preferably directed oppositely to those of slides 112. There is a slide 112, for each lever 105, and in line therewith; and a slide 115, for each lever in line therewith. The purpose of these slides is to engage with novel cams and thereby cause the shafts 103, 104 to be revolved various extents. The frames 109, are reciprocable laterally and for this purpose are mounted upon shafts 116, and 117, which are arranged to slide longitudinally in supporting guides 118, forming parts of the frame of the machine. The purpose of the reciprocating movement of frames 109 is to bring either the slides 112 or the slides 115, into position to be operated by the ends 108, of the levers 105. The shafts 120, are provided with arms 121, which carry pins 122, projecting through apertures in the shafts 116, and 117, respectively so that upon every oscillatory movement of the shafts 120 the shafts 116, 117 will be reciprocated.

Upon the shaft 103, I have arranged the cams 123, 124 disposed on opposite sides of the several slides: the cam 123, being adapted to be engaged by any of the slides 112, and the cam 124, by the slides 115, when the shaft 103, is reciprocated one way or the other. The cam faces 125, of these cams are toward the several slides, and the face slants from the top 126, backwardly on each side to the opposite point 127. The cams are fixed to the shaft 103, so that movement imparted to the cams will be transmitted to the shaft and movement imparted to the shaft will be imparted to the cams. It is desirable that the incline 125 of the cams 123, 124, 132, and 133 be steep in order that the slides will not bind thereon: and it is also advisable that the circumference of these cam faces be small in order to have as short a thrust as possible for the shafts 103 and 104. I have therefore made these cams of small circumference and their cam faces steep, but in doing so, it makes it difficult to arrange enough of the slides 115, 112, 115', and 112' in a circle small enough to have all the slides engage with the cam faces. In order to provide for this difficulty I have provided an arrangement which will be understood from Figs. 11 and 12. I have arranged the slides 112, 115, 112' and 115' so that several, (here shown as three) engage a cross piece 112$^a$, of the slides 112$^b$, so there will then be one third as many slides 112$^b$, as 112, 112', etc., and this reduced number can be arranged in a small circle, to engage the cam faces 125. On the several cams 123, 124, 132, 133, I have arranged an extended arm 125$^a$, each of which has a V shaped notch 125$^b$ directed toward the several slides 112, 112', etc., with which their cams coöperate. This notch is the width of the three slides 112, 112' which engage with the plates 112$^a$. When the shafts 103, 104, are reciprocated, one of the slides 112, 112', etc., as the case may be, will engage a cam face 125 and will revolve the cam and its shaft, but this slide only represents the approximate position to which the cam and shaft are to be brought. By the time the low part 127 of the cam comes around to the slide 112$^b$ however, the V notch 125$^b$, in the arm 125$^a$, will straddle the particular slide 112, which is advanced, and the completion of the revolving motion of the cam and its shaft will be caused by the notch in arm 125$^a$, acting on the advanced slide 112, which is the one representing the exact position to which the cam is to be revolved. The slides 112$^b$, therefore, acting on cam face 125, perform part of the revolving action on shaft 103, and the slide 112, the remainder. This is true of slides 112, 115, and 115'. I am therefore able to use a cam of small circumference and arrange enough slides in a circle to accomplish the desired results. The shaft 103, is provided with a grooved collar 128, in the groove 129, of which engages a pin on an arm 130, and the latter oscillates with a shaft 131. Through this connection the shaft 103, is reciprocated to engage the cam 123, with any of the slides, 112, in line therewith, or to engage the cam 124, with any of the slides 115, in line therewith.

The shaft 104, is provided with cams 132, and 133, similar to cams 123, 134, and arranged to be engaged by the slides in the right hand set of Fig. 5. This shaft has a hub 135, which is engaged by a pin on a lever 303, which lever oscillates with shaft 303ᵃ, and through this means the shaft 104, is reciprocated to bring either cam 132, or 133, into engagement with their respective slides. The cams 123, 124, are arranged with their high points 126 in a line with each other. The same is the case with cams 132, and 133.

For returning the slide of each set I have provided on the shafts 103, 104, loose hubs 136, which carry a circular plate 137, disposed between the slides 112, and 115, and the peripheries 138, of these plates are slanted in opposite directions, where they engage the slides. A link 139, is connected with a portion of the hub 136, and the link connects with an arm 140 on the shafts 103. The arm 140, is part of a hub 141, which has a groove therein, and in the groove engages a pin on a lever 142, oscillating with a shaft 143. The oscillations of the shaft 143, and arm 142, serve to reciprocate the hub 141 and through the link 139, the hub 136. This construction is duplicated as to shaft 104.

The shafts 103, 104, through their revolving or oscillating action are adapted to operate, each a portion of the mechanism for selecting the punch locking slides. The shafts themselves have no definite position relative to their revolving motion, but are simply operated to cause the desired action by being turned one way or the other, and are left in such position until the next successive operation. That is, if the full construction herein be followed, these shafts do not have to be returned after each operation to a normal position, though some of the devices which are operated thereby have to be. On shaft 103, I have provided a gear 144, whose hub is slidable longitudinally upon the shaft. The gear is caused to turn with the shaft through an arm 146, whose hub 147, is secured on the shaft and through a lateral pin 148, on the arm 146, which extends through an aperture in the gear and is long enough to engage the gear in its shifted positions. The hub 145, has an arm 149, straddling the hub 147, and it is connected to a sleeve 150, loose on the shaft. In a groove 151 of this sleeve engages a pin on an arm 152, which oscillates with a shaft 153, so that the oscillations of the latter will cause the reciprocation of the gear 144, on the shaft 103.

The shaft 104, is provided with a gear 154, which is similar to the gear 144, and it is revolved and shifted by similar devices to those which actuate gear 144, the devices for this purpose being numbered from 145' to 153'. The shifting of the gears 144, 154, is for the purpose of causing the shafts to operate either one or the other of two sets of punching devices, so that the latter may be operated alternately and the punching operation as a whole, made faster.

In Figs. 5 to 12, I have shown the mechanism by which the punching elements are selected, locked, reciprocated to perforate the card and the locking and selecting devices returned. I have shown certain pin drums for operating and selecting slides. On a shaft 155, which is journaled in suitable supports 156, I have provided a pin drum 157, which is fixed to the shaft 155, and the shaft has a gear 158, which is arranged to be operated every alternate operation of the machine by the gear 144, on shaft 103. The pin drum has pins 159, arranged radially from its periphery which are arranged similar to the pins on the drums e, etc. of my said Patent No. 627,256; for a similar purpose; but in the present instance wherein I have shown the machine constructed on a twenty four unit basis, there will be twenty four such pins 159 arranged spirally in reverse directions from a starting point. Preferably to the side of shaft 103, opposite to the first drum I have arranged a shaft 160 which is journaled in the supports 162; and this shaft carries a drum 161, which is in all respects similar to drum 157. On the shaft 160, is a gear 163, by which the shaft 160, is revolved through the meshing of gears 144, and 163. The gears 158, and 163, are out of line, so that the gear 144, may be shifted to mesh with either of them but not simultaneously with both. The shifting of gear 144, causes either drum 157, or 161 to be revolved to the same extent as the shaft 103, and in either direction. I have duplicated these parts for shaft 104. The drums 157' and 161' are mounted on separate shafts which have gears operated by the gear 154, on shaft 104, and the parts are operated in the same manner. The parts as to shaft 104 have the same reference numerals as those of shaft 103, but the numerals are in the prime.

In Fig. 5, I have shown the shifting devices of the opposite ends of the machine connected by rods so that similar devices will be shifted in unison by the same operating means; and in Fig. 12 I have shown devices for shifting the various mechanisms.

In Fig. 5, I have shown arms 301, on the same hubs as arms 142, 142' connected by a rod 302, whereby the plates 137, 137' are shifted together. On the same hubs as the arms 130, 130', I have arranged arms 303, which are connected together by a rod 304, whereby their hubs are oscillated together to reciprocate shafts 103, and 104. On the same hubs as arms 152, 152', I have provided arms 305, which are connected together by a rod 306, whereby gears 144 and 154 are reciprocated together. On the arms 121, 121', are pins which are connected by a rod 307, whereby shafts 120, 120', are caused to rock in unison. On the same hub as arm 142' I have arranged a third arm 309; on the same hub as arm 130' I have provided an arm 310; and on the same hub as arm 152' I have arranged an arm 311; to which arms the operating action is applied to shift the various devices. By reference to Fig. 12, the devices for operating these may be understood.

On the secondary shaft 231, of the machine I have provided several cams, an example of which is shown in Fig. 13. This cam 312, has a cam groove 313, which is designed to rock a lever in one direction upon a half revolution of a shaft 231, and in another direction on the next half revolution. I preferably employ four such cams to operate the devices shown in Fig. 14, but the relative positions of the cams on the shaft will differ in order that the several levers will be operated in the order necessary to time the several operations in accordance with the description herein of the operation of the machine.

In Fig. 12, I have shown a lever 314, fulcrumed on a shaft 315, one arm of which lever has a bowl 316, that travels in the groove of a cam like one shown in Fig. 15. The other arm of this lever is connected by a link 317, with the arm 309. The cam which acts on bowl 316, therefore rocks the lever 314, and through the link 317 the arm 309, is rocked to reciprocate both plates 137, 137'. I have arranged a lever 318, on a shaft 319 which has a bowl 320, traveling in the groove of a cam similar to that shown in Fig. 13. This lever is connected by a link 321, with the arm 310, so that the rocking of lever 318, causes the shifting of shafts 103, and 104. On a shaft 322, fulcrums a lever 323, the bowl 324 of which travels in the groove of a cam similar to that shown in Fig. 13. The lever 323 is connected by a link 325, with the arm 311, so that the rocking of lever 323 causes the shifting of gears 144, 154. On a shaft 326, I have fulcrumed a lever 327, which has a bowl 328, and the latter travels in the groove of a cam similar to the one shown in Fig. 13. The other arm of lever 327, has a jaw 329, which straddles a pin 330. The latter is carried on an arm 331, secured to the shaft 120. When the lever 327 rocks, the shaft 120 is oscillated and this causes the shifting of the frames 109, 109'.

I have shown a punching block 164, which is mounted on the base 165, of the punching machine, and this block is preferably the same in all respects as the punching block in my said patent. Likewise the plates 166, and 167 between which the pattern roll or card is intermittently fed are the same as in said patent. I prefer to employ the two rows of punches 168, and 169, arranged in staggered relation, one row slightly to the rear of the other, as in my said patent; and I prefer to provide the same power means for the punches as in my said patent, but the devices for locking them are different. The punch rods 168, and 169, are provided with enlargements 170 which are engaged by the supporting plate 171 and above these enlargements I provide a bar 172; the rods 168, 169, passing through both bars the same as in the said patent. The head 173, which carries the bar 171 is reciprocated twice for each complete operation of the machine, preferably by the same mechanism as that used to operate the punch block 1, in my said patent. In fact, the arrangement of the punches and their operation are the same as before, but the devices for selecting and locking are differently constructed and operated.

The devices for selecting and locking the punches are as follows:—As previously stated the drums 157, 157', and 160, 161 are provided with peripheral pins 159, arranged in the manner shown in said patent. For the drums 157, 157' there is a rocking plate or bar 174, which is carried on the ends of arms 175, the latter being mounted on a shaft 176. The bar 174, is provided with as many apertures in a row, as there are pins 159, on each half of the drums 157, 157', and therefore they are the same in number as the punches 168, and 169. It is understood that there are a number of additional punches made operative or selected by other means than said pin wheels. Through apertures in the bar 174, extend pins 177, each having an enlarged head 178, to prevent it from falling, and these pins 177, are adapted to move up and down in their apertures, or rather the bar 174, is adapted to move up and down relative to the pins. This arrangement is somewhat similar to the pins of my said patent. There is a reciprocatable slide for each pin 177, arranged preferably above the latter, which slides are adapted to be selected by the pins 177, and therefore by the drums 157, 157'. The slides 179, are engaged by certain of the pins 177, while the slides 180, which are arranged side by side and alternating with the slides 179, are engaged by pins 177, alternating with those which engage the slides 179.

The slides 179, and 180 are adapted to operate certain punch rod locking members in such a manner that the selected punches will be made operative, but in such a manner that other selecting mechanism can operate upon the punch locking elements, as will be apparent. For each slide 179, there is a locking element, consisting of a plate 181, which is adapted to be reciprocated horizontally in the slots 182, of the punching frame 173. While for each slide 180, there is a similar locking plate 181, which I arrange alternately with the plates which are engaged by slides 179. The plates 181, have a recess 183, in their lower edge. The plates are adapted to coöperate with the punches 168, to lock them and the plates 181 engaged by slides 179, are likewise adapted to lock the punch rods 169.

The slides 179, and 180, extend through a guiding support 184, and are adapted to engage the ends of plates 181, respectively, for the purpose of moving the plates to the left in Fig. 6: but their return is preferably effected by a separate element so that the plates 181, may be operated when the slides 179, and 180, are at rest, by a second set of slides.

The slides 179, are provided with projections 185, and 186, and with these projections the oscillating plate 187, on the shaft 188, is adapted to engage for the purpose of reciprocating the slides 179, back and forth to move the locking plates 181. The slides 180 are likewise provided with projections 189, 190 with which the oscillating plate 191 on the shaft 192, engages, to reciprocate the slides 180, back and forth. The slides 179, and 180 have their separate reciprocating devices because their time of movement is not the same. The plate 187, is so arranged that it will engage the projections 185, and 186 on the slides 179, but will not operate upon the slides 180: while the plate 191 will only operate on the projections 189, and 190 of slides 180 and will not operate on the slides 179.

In front of the plates 181, I have arranged a plate 192, which is carried on a shaft 193, and the oscillatory movement of this plate serves to return the slides 181, periodically after each operation: and this will occur for each row of perforations placed upon the card, as only half the row of perforations is made at one time, by the selected punches of one row.

After each operation of the drums 157, 157′ they are returned to their normal or intermediate positions by mechanism similar to that used to return the drums $e$, $e'$, $e^2$, and $e^3$, of my said patent, but the time of operation will be changed, as will be apparent from the subsequent description. On the shaft 194, I provide arms 195, to which are fulcrumed the upwardly extending tongs 196, and 197, which straddle the shafts of the drums 157, 157′. After each operation of the drums, 157, 157′ in either direction from the normal the tongs 196, 197, are reciprocated, and upon their downward movement either the tongs 196, or the tongs 197 engage with a member (see Fig. 6) carried by the shafts according to which direction the shafts were revolved from the normal and cause the shafts, and drums 157, 157′ to be returned to their normal or inactive position. The tongs 196, 197, will be reciprocated at each alternate operation of the punching machine.

I provide a second set of slides for operating and locking plates 181, which can be operated independently of the first set and which are in fact operated alternately thereof.

On the shafts 160, 160′ are arranged the drums 161, 161′, which are in all respects similar to the drums 157, 157′ and they have pins extending outwardly therefrom in the same order of arrangement.

I have provided an oscillating shaft 176′, on which are carried the arms 175′, and between these is carried a bar 200, which is in all respects like the bar 174. It has apertures and pins 201, extending therethrough which have enlarged heads. Above each pin 201, I arrange slides 202, 203, which coöperate with the locking plates 181. The slides 202, 203, are similar to the slides 179, 180, but are preferably straight. The free ends of these slides pass through apertures in the guiding plate 184, and are adapted to engage the plates 181, below the slides 179, 180. These slides preferably are not connected with the plates 181, but are only adapted to move the latter to the left in Fig. 6. The slides 202, have upward projections 204, 205, which are adapted to be operated upon by the oscillating plate 206, carried upon a shaft 207, whereby the slides may be reciprocated in a similar manner to the previously mentioned slides 180. The slides 203, are arranged beside the slides 202, and alternate therewith, and they also pass through the guiding plate 184, and engage the alternate locking slides 181. These last slides are provided with projections 208, 209, with which the oscillating plate 210 carried upon a shaft 211, engages; and by means of the oscillating plate, the slides 203, are reciprocated at certain periods, to move the locking plates with which they engage. These slides 203, are preferably straight.

The slides 179, and 202 each operate the same locking plates 181, while the slides 180, and 203, both operate the same plate 181, but the slides 179, and 180 and the slides 202, and 203 are operated at different times, as will be apparent hereinafter.

On the shaft 198, I have mounted arms 199 which carry the tongs 199′ and 199″, and these tongs straddle the shafts and operate upon the engaging members of the shaft to return the latter and the pin drums 161, 161′ back to their normal position after each operation: but the tongs 199′, 199″, operate at a different time to the tongs 196, 197, that is, they are alternating in their movements. These tongs and their operation may be fully understood by referring to my Patent 786890. I have provided bars 213, and 214 as stops for the slides 179, 180 and 202, 203, respectively.

When the pin drums 157, 157', are operated certain of the slides 179, 180, will be selected by the pins 159, on the several drums, according to the positions to which the drums are moved, while certain of the slides 202, 203, will be selected, when the drums 161, 161' are operated, according to the positions of the latter. These drums 157, 157' and 161, 161' are therefore adapted to produce the same results in regard to the locking of the punch rods. They are adapted to be operated alternately however, and to bring this about I preferably connect the drums with the stitch determining mechanism alternately.

I prefer to provide the mechanism for alternately locking the stitch determining drums where it will act upon the pinions 158, 158' and 163, 163'. On the shaft 215, I have arranged the arms 216, 217, which extend toward the pinion and on the ends of these I provide the dogs 218, and 219 respectively which are adapted to engage between the teeth of the pinion. The dogs 218, 219, are arranged to travel in different arcs and I preferably cause this by arranging the dogs on the arms 216 and 217, at different radial distances from the shaft 215, where the arms fulcrum. Extending in the opposite direction from the first mentioned arms I provide arms 220, and 221, which fulcrum from the shaft 215, and which carry dogs 222, and 223, respectively; and these dogs are caused to travel in different arcs, preferably by arranging them at different radial distances from the shaft 215. The dogs 222, and 223, are so arranged as to enter between the teeth of the pinion for the purpose of locking the latter. On the ears 224, of each of the arms 216, 217, 220, 221, I connect spiral springs 225, which tend to draw the arms and their dogs toward their pinions. This movement caused by the springs is a resistible one, while the movement of the arms away from the pinions is caused by positive means. On the shaft 215, I also provide on the sleeve 226, angularly disposed arms 227, and 228, each of which has a contact pin 229, the former being arranged to engage the arms 216, 217, while the latter is arranged to engage and move the arms 220, 221. These arms are adapted to rock with the sleeve 226.

There are various cams shafts, and levers provided for operating the several devices previously described at various predetermined periods and they consist of the following. The shaft 230, is the main shaft of the punching machine and is operated from any suitable source of power. Preferably parallel with the main shaft I provide a secondary shaft 231, which is arranged to be operated at half the speed of the main shaft, so that while the main shaft makes one complete revolution in one complete punching operation, this shaft 231, makes one half revolution, or one complete revolution for every two punching operations. I have provided a gear 232, on the main shaft 230, and a gear 233 on the shaft 231 of twice the size of gear 232 so that the shaft 231 is operated from the main shaft at half the speed of the latter. On a shaft 234, I have fulcrumed a lever 235, which is connected by a link 236, with the arm 237 which rocks the sleeve 226, and therefore operates the drum locking devices. The lever carries a bowl 238, which travels in the cam groove 239, of a cam 240, on the secondary shaft 231. The arm 237, therefore will be rocked to the left at one operation of the punching mechanism and to the right at another, remaining in its extreme positions substantially the whole time of the punching operation.

The returning tongs are operated as follows:—On a shaft 241, I fulcrum a one arm lever 242, which carries a bowl 243, which travels in the cam groove 254, of a cam on the secondary shaft 231. To the stud of the bowl is fulcrumed a link 244. The link 244, is also fulcrumed to an arm 245, which is mounted on a shaft 198 which also carry the arms 199. At each revolution of the shaft 231, therefore the lever 242, is rocked and the tongs 199', 199" are caused to fall, and return the pin drums 161, 161', and rise again to the normal position.

A one arm lever 246, is fulcrumed on a shaft 247, and carries a bowl 248, which travels in the same cam groove 254, as the bowl 243. To the lever 246, is fulcrumed a link 249. The link 249, connects with the arm 250 on shaft 194, which also carries the arms 195. At each revolution of the shaft 231, the lever 246, will be rocked and the tongs 196, 197, will be caused to fall, and thereby return the pin drums, 157, 157' to their intermediate or normal positions, and then rise again to their own normal position. As the bowls 243, and 248, engage the cam groove 254, on opposite sides of the cam, the levers 242, and 246, will be caused to rock alternately and one at each complete operation of the punching mechanism.

The arms 175, and 175' which carry the bars 174, and 200, in which the pins 177, and 201, are mounted, are operated as follows: I provide a lever 251, which fulcrums on the shaft 252, and on one end it has a bowl 253, which travels in the cam groove 254, of a cam on the shaft 231. To the other end of the lever 251, is fulcrumed a link 255, which extends over and is fulcrumed to an arm 256, which is secured to the shaft 176' which carries the arms 175'. The movement of the lever 251, causes the bar 175' to be oscillated once for every two punching operations. A lever 257, is fulcrumed on a shaft 258, and one end has a bowl 259, which travels in the groove 254, of the same cam as the bowl 253, of lever 251. To one arm of this lever is fulcrumed a link 260, which is also fulcrumed to an arm 261, which is secured to shaft 176, which shaft carries arms 175. The rocking of the lever 257, on shaft 258, causes the bar 174, to be oscillated, once for every second punching operation, and since the bowls 259, and 253, engage opposite each other, in the cam groove 254 the bars 174, and 200 will be operated alternately.

The push plates 187, 191, 206, and 210, are operated as follows: I have provided a lever 262 fulcrumed to a shaft 263, and one arm carries a bowl 264, which travels in a groove 265, of a cam on the shaft 231. A link 266, fulcrumed to the lever 262, is also connected to the arms 267, which is secured to, and rocks the shaft 188, thus oscillating the plate 187, at every second punching operation of the machine. A lever 268, fulcrumed on the shaft 269, also has a bowl 270, which travels in the cam groove 265. A link 271, fulcrumed to one end of this lever, is also fulcrumed to an arm 272, on the shaft 192, and the movement of the lever 268, causes the shaft 192, to oscillate thereby moving the plate 191. As the bowl 264, is slightly in the lead of bowl 270, the shaft 188, will be oscillated slightly in advance of shaft 192. The other push plates are similarly operated and preferably from the same cam. A short lever 273, fulcrumed on the shaft 274, has a bowl 275, traveling in the cam groove 265. A link 276, is fulcrumed to the lever 273, and is also fulcrumed to an arm 277, in the shaft 207. The shaft 207, and its push plate 206, is therefore oscillated at every second punching operation of the machine. A lever 278, is fulcrumed on a shaft 279, and it has a bowl which travels in the cam groove 265. A link 281, connected to the lever 278, is also fulcrumed to an arm 282, on the shaft 211, whereby the latter and its push plate are oscillated at every second punching operation. As the bowl 280, travels in advance of the bowl 275, in the cam groove 265, the shaft 207, will be oscillated slightly in advance of the shaft 211.

As the bowls 275, 280 engage the cam groove 265, on opposite portions to the bowls 270, 264, the shafts 207, 211 and 188, 192, will be operated in alternate relation, one pair at one punching operation and the other at the next and so on.

The push plate 192 has to be operated twice for each punching operation of the machine, that is, every time when the punch block has acted; and I therefore prefer to operate this from the main shaft, I have fulcrumed the lever 283 on a shaft 284, and one end carries a bowl, 285 which travels in a cam groove 288 of a cam on the main shaft 230. This cam has two rises and therefore the lever 283, will be twice rocked for each revolution of the main shaft. A link 286, is fulcrumed to one end of lever 283 and the other is fulcrumed to an arm 287, on the shaft 193. The operations of the lever 283, will cause the shaft and its push plate 192, to oscillate twice for each complete punching operation of the machine, as it is necessary in this form of machine to return the locking slides twice.

Operation: The operation of much of the mechanism will be apparent from the above description. Let it be assumed that the operator is proceeding to lay out a stitch on the design placed on the board 1. Consider that the pointer is in such a position that the pin 20, is in contact with wire 27, and that pin 25, is in contact with wire 51. If the pointer is now moved to a new position, a different set of contacts will be made. Let it be assumed that the position to which the pointer is moved brings the pin 20, in contact with wire 28, and pin 25, in contact with wire 52. The former closes a circuit through magnet $28^b$, through wires 93, 96, coil of magnet 85, wires 86, and 87, and the mechanical circuit closer completes the circuit back to the generator. The magnet $28^b$ thus energized will draw over the armature lever 105, which lies near such magnet and the slide 115, with which such lever engages will be moved inwardly sufficiently to come into the reciprocal path of the cam 124. The circuit closed through wire 52, and magnet $52^b$, will cause the magnet to rock its lever 108' and thus move a slide 115' into the reciprocal path of the cam 133. By the time this has been done the frames 109, 109' will be shifted to the right in Fig. 5, far enough to bring the slides 112, 112', under the ends of levers 108, 108' ready for the next operation of the pointing device. By this shifting operation armature lever 105 has been pushed back to its normal position by the beveled rim of frame 109. When the slides 115, 115' were positioned as above described, both shafts 103, 104, are reciprocated to the left in Fig. 5. The slide 115, which was moved in, being in the path of the cam 124, the face 125, will contact therewith, as the cam reciprocates and a revolving motion will be imparted to the cam and to the shaft 103. The direction of this rotation will depend upon whether the slide 115 is in line with the slant 125, to one side or the other of the cam point 127, of the cam and thus it depends upon the location of the particular slide 115, which was moved in. The reciprocation of cam 124, in engagement with the slide, will cause the cam to revolve until the low part 127, comes into line with such slide which will take place at the end of the reciprocation of the cam. This will be true no matter which of the slides 115 115', engages the cam. The amount of revolving motion imparted to the cam 124, in moving from its old to its new position, will depend upon the particular slide 115, which engages, as each slide has a different position in the circle. The low part 127, of the cam will always be moved into line with the slide which is advanced which represents the vertical movement of the pointer.

Since the shaft 103, is not returned after each operation to any normal position, the point 127, will simply be brought around to the particular slide 115, which is moved in. In like manner the slide 115' in the path of the cam 132, causes the latter to be revolved, when it is reciprocated; to an extent and in a direction depending upon the position of the particular slide 115' which was moved in. The shaft 103, will have been revolved, and through gears 144, and 158, the pin drum 157, will have been revolved to the right or left, a certain amount. In like manner the shaft 104, will have been revolved and through gears 154' and 158' the pin drum, 157' will have been revolved to the right or left a certain amount, and the punch selecting mechanisms will be set into operation. As soon as the cam 124, has been revolved by the slide 115 and the cam 132, by the slide 115' the plates 137, 137' will be reciprocated and their slanting edges 138, will cause the slides 115, 115' which were moved in, to be returned for another operation.

While the selection of the punching elements and other operations are taking place, the operator will lay out a second stitch by positioning the pointing device, and closing circuits through other magnets on rings 79, and 92. When the levers 105, and 105', are rocked in this second operation they will each move a slide 112, and 112' respectively, into the reciprocable paths of the cams 123, and 133. The shafts 103, 104, will now be reciprocated in directions reverse to their former movement, and the slides 112, 112', which were moved in, will perform the same functions as to cams 123, 133, as the previous slides did as to cams 124, and 132. That is, they will cause the shafts 103, 104, to be revolved in a direction, and to an extent, corresponding with the positions of the slides 112, 112' which are operating. Before the shafts 103, 104, are reciprocated the second time, the gear 144, is moved out of mesh with gear 158, and into mesh with gear 163; and gear 154 is moved out of mesh with gear 158', and into mesh with gear 163'. As a result, the second operation will cause the pin drums 161, and 161' to be revolved. This alternate action goes on continuously so long as the machine is operated. From this it will be apparent that shafts 103, 104, are revolved in one direction or the other different extents, according to the motion to be represented by the perforations to be made on the jacquard card. After the slides 112, 112' have positioned shafts 103, 104, the plates 137, and 137' are reciprocated in a reverse direction and the slides 112, 112', which were moved in, are returned for a subsequent operation. Also, the frames 109, 109' will be reciprocated to return the armatures and to bring slides 115, 115' again into operative relation with the levers 108, 108'.

At each operation of the machine the contact breakers 99, and 101, will be rocked to close contact between the wires 84, and 87, respectively; and the former will be operated slightly in advance of the latter. In case either pin 20, or pin 25, simultaneously makes contact with two adjoining vertical or horizontal wires, as the case may be, there will be no conflict in the operation of the machine. Since two adjoining wires run to adjoining magnets on a ring, they come from the magnets respectively to bunches 81, or 94, and to bunches 83, or 98. If circuit is made through a magnet connected with bunch 81, the circuit will be through wire 84, around magnet 85, and to circuit closer 99. As soon as the latter is mechanically closed the circuit will be completed through wire 87, to the generator and the magnet on ring 79, will perform its function. If at the same time a magnet connected with bunch 83, is connected by reason of the pin 25, touching two adjoining wires, the circuit will pass from bunch 83, through wire 88, to the armature 89. Since it is now assumed that a circuit has immediately before been closed and is being held closed through wire 84, breaker 99, and wire 87, the magnet 85, will be energized and the armature 89, will be swung on its pivot to break contact between wires 88, and 91. Therefore the circuit through the magnet connected with bunch 83, will not be completed, and only the first magnet will be operative. If a circuit were not made through a magnet connected with bunch 81, simultaneously with one in bunch 83, the result would have been different. In that case the breaker 99, would connect the wires 84, and 87, but a circuit would not be complete because no contact would have been made by the pin 25, with a wire connected with any magnet running to bunch 81. Therefore magnet 85, would not have been energized, and the armature 89, would be held over by the spring to close the wires 88, and 91. If a magnet to bunch 83, is connected however, the circuit will be completed as soon as the breaker 101 closes the wires 91, and 87, and the magnet thus energized will perform its function. The circuit breakers 99, 101 are so timed that they perform the additional function of making the magnets in the several rings actuate their several levers and slides at a proper time relative to the operation of the punching mechanism. From the above it will be apparent that if two adjoining wires in either set are simultaneously put in contact by the pointing mechanism, only one will be operative and thus conflict will be avoided. This is true in either horizontal or vertical sets of wires.

Let it be assumed that in the operation now being considered the gear 144, is in mesh with pinion 158. The stitch having been determined and the gear 144, having been revolved to the right or left, as the case may be, the pinion 158, was likewise revolved in accordance therewith. Since the pinion 158, connects with one of the drums 157, the latter will have been moved to the right or left, from its normal or intermediate position, thereby bringing one of the pins 159, on the drum under its corresponding pin 177, of the slide selecting device. The particular pin 159, of the drum 157, thus brought under pin 177, will depend upon the direction and extent of rotation of the drums the same as in the case of the drums $e, e', e^2$, and $e^3$, of my said patent. During this positioning of the drum 157 the drum 161, will lie idle because the pinion 144, is not in mesh with the gears 163. A similar action takes place in the mechanism on the right of Fig. 5, through the revolution of shaft 104, gear 154, and pinion 158' which affects drum 157'. As soon as this positioning of the drums has taken place the arm 237 will be rocked to lock pinions 158, 158' and unlock pinions 163, 163' and the gears 144, 154, will be immediately shifted from pinions 158 and 158' respectively to pinions 163, and 163'. As soon as gears 144, 154, are thus shifted, the operator can proceed to lay out the next stitch. To do so he again moves the pointer and thereby positions the pinions and the drums 157, 157', connected thereto. In the meantime the rotation of the main shaft continues and the cam groove 254, will cause the lever 251, to rock, and consequently the shaft 176' will be oscillated to move the bar 200, which carries the pins 201, toward and from the pin drums 161, 161'. When the bar 200 goes down, the pins 201, which are not opposed by a pin 159, on the pin drums 161, 161', will go down with the bar 200, while the ones which strike a pin 159, on the drums 161, 161', will be held up. The ones so held up will retain the corresponding slides 202, 203, in raised position until the push plates act thereon. The cam groove 265, will now cause the lever 273, to rock, whereby the shaft 207, will be oscillated and with it the push plate 206. The slides 202, which are in the raised position, held there by pins 159, will be caused to move to the left in Fig. 6, by the push plate and they will move their corresponding locking plates 181 forward, until they come in such a position as to lock certain of the first row of punches. The punch bar 173, will now be lowered by the mechanism shown in my said patent and the punches which are locked by the slides 181, will perforate the paper pattern; while those which are not locked, will have no action on the paper, but will simply rest upon the surface. After the punch bar 173, returns and the punching rods have been withdrawn from the card, the push plate 206, will return the slides 202 which were advanced, to their former position; and the push plate 192, will return the locking plates 181, to their former, or inactive position. The paper card will now be advanced by the mechanism shown in said patent, the distance between the two rows of punches 168, and 169, to bring the perforations just made in line with the advanced punches 168. The slides 203, which are held up by pins 201, comprising part of the first set of slides, will now be advanced by the push plate 210, in consequence of the rocking of the lever 278. The advancing of the slides 203, will move their corresponding locking plates 181 forward to lock their punch rods 168. The punch bar 173, is now again depressed and punch rods of the forward row 168, which have been locked will perforate the paper; and these perforations will come in the same transverse line as the first perforations made by rods 169. After the punch bar is raised, the push plate 210, will return the slides 203, which were previously advanced, to their former position and the push plate 192, will again rock, to return the plates 181, which were last active.

The machine has now completed one punching operation, the main shaft 230, has made one complete revolution and the shaft 231, has made one half a revolution.

After the gears 144, 154, 163, and 163', and the drums had been positioned preparatory to the last operation, the gears or pinions 158, 158' and the drums connected thereto were being locked by the dogs 222, 223, as shown in Fig. 8, by the cam groove 239, causing lever 235, and by means of the bar 236, the arm 237, to rock to the position shown in Fig. 8. This rocked the sleeve 226, and with it the arms 227, 228. The rocking of the arms 227, 228, and their pins 229, permitted the springs 225, to rock the arms 220, 221, toward the pinions 163, 163' and the dogs 222, 223, thereof, enter the teeth of the pinions and lock them against any movement; and these pinions remained locked until the punching operation just described was completed. The rocking of the arms 228, also caused the arms 216, 217, to be rocked and their dogs 218, 219, were moved out of the teeth of the pinions 158, 158'. Immediately thereafter the gears 144, and 154, are shifted from pinions 163, 163' respectively into mesh with pinions 158, 158'. This shifting of the gears is delayed long enough to allow the dogs 216, 217, to be released from the pinions 158, 158' and the dogs 222, 223, to be engaged with their pinions 163, 163' in order that no change will take place in the position of the pinions while the gears are being shifted. This shifting operation took place just after the gears 163 163' and their pin drums were positioned in the beginning of the operation just described. That left the gears 158, 158' and their pin drums 157, 157' free to be positioned by the operator as soon as the first punching operation was initiated. As the gears 144, 154, are now disconnected from the pinions 163, 163' this can be done: and the operator, if quick, can perform this operation by the time the first punching operation is completed.

The positioning of the gears 158, 158' and their drums 157, 157' brought certain of their pins 159, under certain of the pins 177, according to the direction and extent of rotations of the drums, the same as was the case in the action of the drums 161, 161'. Through the cam groove 254, the lever 257, link 260, and arm 261, the shaft 176, will be oscillated and the bar 174, as well. This moves the bar 174, toward the drums 157, 157' and those pins 177, which do not strike pins 159, will fall, while those which meet the pins 159, on the drums will be held up and consequently the slides 179, 180, with which they engage. The slides 180, thus held up, which have the projections 190, 189, will be moved forward by the push plate 191, which is caused to rock at this moment by the cam groove 265, lever 268, link 271, and arm 272. In moving forward, the slides 180, will carry their respective locking plates 181, forward, and into locking engagement with their respective punch bars of the rear row 169. The punch bar 173 is now lowered, and raised as before, and the punch rods which are locked will perforate the card. The return movement of the push plate 191, will return the slides, which were advanced, back to their starting position, and the push plate 192, will return the locking plates 181, back to their inactive position. The jacquard card will now be fed by the mechanism shown in my said patent for that purpose, equal to the distance between the two rows of punches 168, 169, to bring the perforations just made in line with the forward row of punches 168. The push plate 187, is now oscillated by reason of the cam groove 265, lever 262, link 266, and arm 267, and it will move the slides 179, which have the projections 185, 186, and which are held up by the pins 177, forward. They will carry with them their respective locking plates 181, which will be moved into locking engagement with their respective punch rods 168, in the front row. The punch bar 173, will now go down again to force the locked punch rods through the card, and will then be raised. The push plate 187, will now return the slides 179, which were advanced, back to their starting position. The push plate 192, will also return the plates 181, back to their inactive position.

When the second punching operation has been completed the main shaft will have made its second revolution, and the shaft 231, will have made one complete revolution and the parts will be brought to their original position.

After the first punching operation was over, and the slides 202, 203, were returned and the bar 200, raised to its upper position, the pin drums 161, 161' were returned to their normal or intermediate position. This was caused by the cam groove 244, lever 242, link 244, arm 245, moving the shaft 198, so that tongs 199', 199'', which are normally in their high position, are lowered and in their downward movement either one or the other meets the projection 300, on the shaft 160, and returns the latter, and associated parts, back to their intermediate position ready for a subsequent operation and then the tongs are raised again in to the high position. Also after the second punching operation, the cam groove 244, lever 246, link 249, arm 250, shaft 194, and arm 195, caused the tongs 196, 197, to fall, and to return the drums 157, 157' in similar manner to the first tongs, and then rise again. These tongs are preferably arranged to operate similar to the tongs of Patent 786,890. It may be stated again that between the two punching actions of each complete punching operation the card is advanced one position by the feeding mechanism shown in my said patent.

Instead of laying out a stitch and then initiating the punching operation and having to wait until the latter is completed and the parts restored, before proceeding to lay out a second stitch, the delay is avoided and the operator may lay out stitches as fast as his ability will permit and he need not wait for any appreciable length of time. Just as soon as a stitch has been laid out by positioning the first set of pin drums, he immediately proceeds to lay out a second stitch by positioning a second set of drums, which have in the meantime been connected up with the controlling mechanism. This second positioning of the second set of drums selects from a second set of slides, which are ready to advance just as soon as the first set of slides have been returned and so on. It is therefore apparent that in permitting the operator to lay out a new stitch as soon as a punching operation has been initiated, under my present invention, the punching operations of my machine are not made slower but in fact are made faster, because of the double arrangement of slides, both of which perform the same function, in rapid succession. When one set of slides performs its function and is returned, the second set is already selected and is ready to perform its function at once. It will also be apparent that the machine is positive in its operation and that there can be no conflict in its several devices.

The mechanism from the pin drums down to the punching elements is not here claimed *per se*, as it forms the subject matter of an application filed by me on the eleventh day of July, 1911, and serially numbered 638,009 but is only here claimed in connection with the other branches of my present invention.

From the the foregoing it will be apparent that the operator can lay out the stitches very rapidly, and the selecting and punching elements may be operated as fast as the operator lays out the stitches. Also that the parts all operate in such order that there will be no confusion or conflict.

In describing my invention in detail I do not wish it to be inferred that my invention is limited to the exact structure herein shown and described as I consider the present invention embodies features which are broadly new, and changes may be made throughout the structure without departing from the spirit and scope of the annexed claims.

In using the term stationary elements in the following claims I do not mean that such elements can have no movement in themselves, but that they have a definite location relative to the pointing device, so that the pointing device may select any such element according to its location.

Having described my invention, what I claim is:—

1. A jacquard card punching machine, embodying a series of selectors, arranged in substantially parallel lines, a pointing device adapted to trace a design and arranged to be moved over the said selectors according to the design said pointing device being adapted to coöperate with the selectors, perforating elements, adapted to make perforations in the jacquard card, and intervening mechanism adapted to effect the operation of such of the perforating elements as correspond to the movement of the pointing device in moving from one position to another.

2. A jacquard card punching machine, embodying a series of selectors, arranged in substantially parallel lines, a pointing device, adapted to trace a design and arranged to be moved over the said selectors according to the design, said pointing device being adapted to coöperate with the selectors, perforating elements, adapted to make perforations in the jacquard card, and intervening mechanism adapted to effect the operation of such of the perforating elements as correspond to the movement of the pointing device in moving from one position to another, and means for periodically placing the machine in condition to be affected by the said pointing device.

3. In a jacquard card punching machine, embodying a plurality of series of selectors, each series being arranged in substantially parallel lines, the selectors of one series being arranged at an angle to the direction of the selectors of the other series, a pointing device adapted to coöperate with the selectors of both series said pointing device being arranged to be moved over the two series of selectors according to the desired design, perforating elements adapted to perforate a card, and intervening mechanism to effect the operation of such of said perforating elements, as correspond to the movement of the pointing device in moving from one position to another relative to said series of selectors.

4. In a jacquard card punching machine, means for perforating a jacquard card, and means for controlling the perforating mechanism, embodying a plurality of elements having definite positions, and representing in their control of the perforating elements, different locations of the perforations to be made in the jacquard card, and a pointing device adapted to coöperate with said elements of definite positions to control the perforating operation, and movable freely from one such element to another.

5. In a jacquard card punching machine, means for perforating a jacquard card, and means for controlling the perforating mechanism, embodying a plurality of stationary elements, and a pointing device adapted to select from said stationary elements, said stationary elements representing in their relative locations, different positions of perforations of the jacquard card, and said stationary elements being adapted to control the perforating elements, whereby the different perforations will correspond in position, with the relative positions of said stationary elements.

6. In a jacquard card punching machine, means for perforating a jacquard card, and means for controlling the perforating mechanism, embodying a plurality of stationary elements, and a pointing device adapted to select from said stationary elements, and means whereby said stationary elements will cause perforations to be made by the perforating mechanism, in different positions, representing the extent of the movement of the pointing device, in moving from one of said stationary elements to another.

7. In a jacquard card punching machine, means for perforating a jacquard card, and means for controlling the perforating mechanism, embodying a plurality of stationary elements, a pointing device adapted to select from said stationary elements and means whereby said stationary elements will cause perforations to be made by the perforating mechanism, in different positions, representing the extent of movement in a definite direction of the pointing device, in moving from one of said stationary elements to another.

8. In a jacquard card punching machine, means for perforating a jacquard card, and means for controlling the perforating mechanism, embodying a plurality of elongated parallel elements, and a pointing device, adapted to select from said parallel elements, by operating upon different portions of their length, and means whereby said parallel elements will cause perforations to be made by the perforating mechanism, in different positions, representing the extent of movement of the pointing device, in moving from one parallel element to another of said elements.

9. In a jacquard card punching machine, means for perforating a jacquard card, and means for controlling the perforating mechanism, embodying a plurality of elements having definite positions, and representing in their control of the perforating elements, different locations of the perforations to be made in the jacquard card, pointing device, adapted to select from said elements of definite positions, and movable freely from one such element to another, an embroidering machine embodying a movable tambour frame, and means movable with said pointing device, and adapted to produce corresponding movements in said tambour frame.

10. In a jacquard card punching machine, means for perforating a jacquard card, and means for controlling the perforating mechanism, embodying a plurality of elements having definite positions, and representing in their control of the perforating elements different locations of the perforations of the jacquard card, a pointing device adapted to select from said elements of definite positions, and movable freely from one such element to another, an embroidering machine, embodying a movable tambour frame and a pantograph arranged to be operated with said pointing device, and adapted to produce movements in the tambour frame, corresponding with the movements of said pointing device.

11. In a jacquard card punching machine, means for perforating a jacquard card, and means for controlling the perforating mechanism, embodying a plurality of elements having definite positions relative to the movements of the pointing device, and representing in their control of the perforating elements, different locations of the perforations to be made in the jacquard card, and a pointing device, adapted to select from said elements of definite positions, said pointing device being freely and universally movable in at least one plane of movement.

12. In a jacquard card punching machine, means for perforating a jacquard card, and means for controlling the perforating mechanism, embodying a plurality of stationary elements, and a pointing device, adapted to select from said stationary elements, and means whereby said stationary elements will cause perforations to be made by the perforating mechanism, in different positions, representing the extent of the movement of the pointing device, in moving from one of said stationary elements to another, said stationary elements being arranged in a plurality of groups, and the various elements having similar positions in the several groups, being adapted to cause perforations to be made having similar positions.

13. In a jacquard card punching machine, means for perforating a jacquard card, and means for controlling the perforating mechanism, embodying a plurality of stationary elements and a pointing device, adapted to select from said stationary elements, and means whereby said stationary elements will cause perforations to be made by the perforating mechanism, in different positions, representing the extent of movement of the pointing device, in moving from one of said stationary elements to another, said stationary elements being arranged in a plurality of groups, and the various elements having similar positions in the several groups being connected to operate the same elements whereby elements in the various groups having similar positions may cause similar perforations to be made.

14. In a jacquard card punching machine, means for perforating a jacquard card, and means for controlling the perforating mechanism, embodying a plurality of equidistant stationary elements, and a pointing device adapted to select from said stationary elements, and means whereby said stationary elements will cause perforations to be made by the perforating mechanism, in different positions, representing the extent of the movement of the pointing device in moving from one of said stationary elements to another.

15. In a jacquard card punching machine, means for perforating a jacquard card, and means for controlling the perforating mechanism, embodying a plurality of elements having definite positions, and representing in their control of perforating elements, different locations of the perforations to be made in the jacquard card, a second set of elements, having definite positions, and representing in their control of perforating elements, different locations of the perforations to be made in the jacquard card, and a pointing device adapted to select from said elements of definite positions in both of said sets, and movable freely from one such element to another.

16. In a jacquard card punching machine, means for perforating a jacquard card, and means for controlling the perforating mechanism, embodying a plurality of stationary elements, a second set of stationary elements and a pointing device adapted to select from both sets of stationary elements, said stationary elements of each set representing in their locations, different positions of perforations of the jacquard card, said stationary elements being adapted to control the perforating elements whereby the different perforations will correspond in position with the relative positions of said stationary elements, and each of said sets of stationary elements being adapted to control different elements of the perforating mechanism.

17. In a jacquard card punching machine, means for perforating a jacquard card, and means for controlling the perforating mechanism, embodying a plurality of stationary elements, a second set of stationary elements, a pointing device, adapted to select from said stationary elements of each set, and means whereby said stationary elements will cause perforations to be made by the perforating mechanism, in different positions, representing the extent of the movements of the pointing device, in moving from one of said stationary elements of a set to another, said sets of stationary elements being adapted to affect different perforating elements of the perforating mechanism.

18. In a jacquard card punching machine, means for perforating a jacquard card, and means for controlling the perforating mechanism, embodying a plurality of stationary elements, a second set of stationary elements, and a pointing device adapted to select from both sets of stationary elements, and means whereby the stationary elements of each set will cause perforations to be made by the perforating mechanism, in different positions, representing, respectively, the extent of movement in a definite direction, of the pointing device, in moving from one of said stationary elements of a set, to another, said several sets of stationary elements being adapted to affect different perforating elements.

19. In a jacquard punching machine, means for perforating a jacquard card, and means for controlling the perforating mechanism, embodying a plurality of elongated, parallel elements, a second set of elongated, parallel elements, arranged in different direction to said first set, and a pointing device adapted to select from both sets of said parallel elements, by operating upon different portions of their length, and means whereby said parallel elements will cause perforations to be made by the perforating mechanism in different positions, representing the extent of movement of the pointing device, in moving from part of one parallel element of a set to part of another element of a set, said different sets of parallel elements being arranged to control different perforating elements.

20. In a jacquard card punching machine means for perforating a jacquard card, and means for controlling the perforating mechanism, embodying a plurality of elements having definite positions, and representing in their control of the perforating elements, different locations of the perforations, a second set of elements having definite positions, and arranged in a different direction to said first set, and representing in their control of perforating elements, different locations of the perforations, said sets being adapted to control different perforating elements, a pointing device adapted to select from said elements of definite positions in both sets, and movable freely from one such element to another, and an embroidering machine, embodying a movable tambour frame, and a pantograph arranged to be operated with said pointing device and adapted to produce movements in the tambour frame corresponding with the movements of said pointing device.

21. In a jacquard card punching machine, means for perforating a jacquard card, and means for controlling the perforating mechanism, embodying a plurality of elements having definite positions, and representing in their control of the perforating elements, different locations of the perforations to be made in the jacquard card, a second set of elements having definite positions, arranged at an angle to said first set, and representing in their control of the perforating elements, different locations of the perforations to be made in the jacquard card, said sets of elements being adapted to control different perforating elements, and a pointing device adapted to select from both sets of said elements of definite positions, said pointing device being freely and universally movable in at least one plane of movement.

22. In a jacquard card punching machine, means for perforating a jacquard card, and means for controlling the perforating mechanism, embodying a plurality of stationary elements, a second set of stationary elements, arranged at an angle to the first one, and a pointing device adapted to select from both sets of said stationary element, means whereby said sets of stationary elements will cause perforations to be made by the perforating mechanism in different positions, representing the extent of movement of the pointing device, in moving from one of said stationary elements of a set to another of the same set, said different sets being arranged to control different perforating elements, and said stationary elements of each set being arranged in a plurality of groups, and the various elements having similar position in the several groups of a set, being adapted to cause similar actions.

23. In a jacquard card punching machine, means for perforating a jacquard card, and means for controlling the perforating mechanism, embodying a plurality of stationary elements, a second set of stationary elements arranged at an angle to the first ones, and a pointing device adapted to select from both sets of said stationary elements whereby said sets of stationary elements will cause perforations to be made by the perforating mechanism in different positions, representing the extent of movement of the pointing device, in moving from one of said stationary elements to another, of a set, said different sets being arranged to control different perforating elements, and said stationary elements of each set being arranged in a plurality of groups, and the various elements of a set having similar positions in the several groups being connected to operate the same elements, whereby elements in the various groups having similar positions will cause similar actions.

24. In a jacquard card punching machine, means for perforating a jacquard card, and means for controlling the perforating mechanism, embodying a plurality of equidistant, stationary elements, a second set of equidistant, stationary elements, arranged at an angle to said first set and a pointing device adapted to select from said stationary elements in both sets, and means whereby said stationary elements will cause perforations to be made by the perforating mechanism, in definite positions, representing the extent of movement of the pointing device in moving from one stationary element to another of the same set, and said sets of stationary elements being adapted to control different perforating elements.

25. In a jacquard card punching machine, means for perforating a jacquard card, and means for controlling the perforating mechanism, embodying a plurality of elements having definite positions, a second set of elements having definite positions, and arranged at right angles to said first set, through which elements the perforating device is adapted to be controlled whereby they will cause perforations to be made thereby in different locations on the jacquard card, and a measuring device, adapted to measure distances, and to select from said elements of both sets, to control their operations, and movable freely from one such element to another.

26. In a jacquard card punching machine, means for perforating a jacquard card, and means for controlling the perforating mechanism, embodying a plurality of stationary elements, a second set of stationary elements, arranged at right angles to said first set, and a device for measuring distances, adapted to select from both sets of stationary elements, said stationary elements of each set representing in their relative locations different positions of perforations of the jacquard card, said stationary elements being adapted to control the perforating elements whereby the different perforations will correspond in positions with the relative positions of said stationary elements, and each of said sets of stationary elements being adapted to control different elements of the perforating mechanism.

27. In a jacquard card punching machine, means for perforating a jacquard card, and means for controlling the perforating mechanism, embodying a plurality of stationary elements, a second set of stationary elements, a device for measuring distances adapted to select from said stationary elements of each set, and means whereby said stationary elements will cause perforations to be made by the perforating mechanism in different positions representing the extent of the movement of the pointing device, in moving from one of the stationary elements of a set to another, said sets of stationary elements being adapted to affect different elements of the perforating mechanism.

28. In a jacquard card punching machine, means for perforating a jacquard card, and means for controlling the perforating mechanism, embodying a plurality of elements having definite positions, and representing in their control of the perforating elements, different locations of the perforations to be made in the jacquard card, a second set of elements, having definite positions, arranged at right angles to said first set, and representing in their control of other perforating elements, different locations of the perforations to be made in the jacquard card, and a device for measuring distances, adapted to select from both sets of said elements of definite positions said measuring device being freely, and universally movable, in at least one plane or movement.

29. In a jacquard card punching machine, means for perforating a jacquard card, and means for controlling the perforating mechanism, embodying a plurality of stationary elements, a second set of stationary elements, arranged at right angles to said first set, and a device for measuring distances, adapted to select from both sets of said stationary elements, means whereby said sets of stationary elements will cause perforations to be made by the perforating mechanism in different positions, representing the extent of movement of the measuring device, in moving from one of said stationary elements of a set to another of the set, said stationary elements of each set being arranged in a plurality of groups, and the various elements having similar positions in the several groups of a set, being adapted to cause the same actions.

30. In a jacquard card punching machine, means for perforating a jacquard card, and means for controlling the perforating mechanism, embodying a plurality of elements forming parts of different electrical circuits, means controlled by said electrical circuits for controlling the perforating elements, and a pointing device adapted to select from said elements of the electric circuits, and movable freely from one such element to another and adapted to cause the same perforation to be made by engagement with different parts of a given element of an electric circuit.

31. In a jacquard card punching machine, means for perforating a jacquard card, and means for controlling the perforating mechanism, embodying a plurality of stationary elements forming parts of different electrical circuits, means operated by said electrical circuits for controlling the perforating elements, said stationary elements representing in their relative locations, different positions of perforations to be made by the perforating elements, and adapted to control the perforating elements whereby the different perforations will correspond in their positions with the relative positions of said stationary elements, and a pointing device movable freely in different directions from one such element of a circuit to another, and adapted to cause the same perforation to be made by coöperating with different parts of a given element of an electric circuit.

32. In a jacquard card punching machine, means for perforating a jacquard card, and means for controlling the perforating mechanism, embodying a plurality of stationary elements, forming parts of different electrical circuits, and a pointing device movable in different directions and adapted to coöperate with said stationary elements to control their electric circuits, and means controlled by said electric circuits, adapted to actuate the perforating elements, to cause perforations to be made thereby, in different positions, representing the extent of the movement of the pointing device in moving from one of said stationary elements to another the coöperation of the pointing device with any part of a given element of an electric circuit being adapted to cause the same perforation.

33. In a jacquard card punching machine, means for perforating a jacquard card, and means for controlling the perforating mechanism, embodying a plurality of stationary elements, forming parts of different electrical circuits, and a pointing device movable in different directions and adapted to coöperate with said stationary elements, to control their electric circuits, and means controlled by said electric circuits adapted to actuate the perforating elements, to cause perforations to be made thereby in different positions, representing the extent of the movement in a definite direction of the pointing device, in moving from one of said stationary elements to another the coöperation of the pointing device with any part of a given element of an electric circuit being adapted to cause the same perforation.

34. In a jacquard card punching machine, means for perforating a jacquard card, and means for controlling the perforating mechanism, embodying a plurality of elongated parallel elements, forming parts of electrical circuits, a pointing device movable in different directions for operating on said parallel elements, to control said electric circuits and adapted to contact upon various portions of said elongated elements, and means controlled by said electric circuits, and adapted to cause the operation of the perforating elements, whereby perforations will be made in the jacquard card in different positions, representing the extent of movement of the pointing device, in moving from one parallel element to another of said elements the coöperation of the pointing device with any part of a given element of an electric circuit being adapted to cause the same perforation.

35. In a jacquard card punching machine, means for perforating a jacquard card, and means for controlling the perforating mechanism, embodying a plurality of stationary elements, forming parts of electric circuits and a measuring device for measuring distances, and adapted to operate upon said stationary elements to control their circuits, means controlled by said circuits and adapted to cause perforations to be made by the perforating mechanism, in different positions, representing the extent of movement of the measuring device, said stationary elements being arranged in a plurality of groups and the various stationary elements having similar positions in the several groups being connected with the same circuits.

36. In a jacquard card punching machine, means for perforating a jacquard card, and means for controlling the perforating mechanism, embodying a plurality of equidistant stationary elements forming parts of electric circuits, a measuring device adapted to coöperate with said stationary elements, to control their circuits, and means controlled by said circuits, and adapted to cause the perforations to be made by the perforating mechanism in different positions, representing the extent of movement of the measuring device in moving from one of said stationary elements to another.

37. In a jacquard card punching machine, means for perforating a jacquard card, and means for controlling the perforating mechanism, embodying a plurality of elements forming parts of electric circuits, a second set of elements forming parts of other electric circuits, and arranged at an angle to said first set, means controlled by said electric circuits, for controlling the perforating elements, the means controlled by the circuits of the separate sets of said elements being arranged to control different perforating elements, and a measuring device adapted to coöperate with both said sets of elements and movable freely from element to element of each set.

38. In a jacquard card punching machine means for perforating a jacquard card, and means for controlling the perforating mechanism, embodying a plurality of stationary elements, forming parts of different electric circuits a second set of stationary elements, arranged at an angle to said first set, and forming parts of other electric circuits, means controlled by said electric circuits, for controlling the perforating elements, said stationary elements in each group representing in their relative locations, different positions of perforations to be caused by said controlling devices, and adapted to control the perforating elements, whereby the different perforations will correspond in their positions with the relative positions of said stationary elements, and a measuring device adapted to act upon said stationary elements to control their several electric circuits.

39. In a jacquard card punching machine, means for perforating a jacquard card, and means for controlling the perforating mechanism, embodying a plurality of stationary elements forming parts of different electric circuits, a second set of stationary elements forming parts of other electric circuits, and arranged at an angle to said first set, a measuring device, adapted to coöperate with said stationary elements, to control their electric circuits, and means controlled by said electric circuits, adapted to actuate the perforating elements, to cause perforations to be made thereby, in different positions, representing the extent of the movement of the said measuring device in moving from one element of a set to another.

40. In a jacquard card punching machine, means for perforating a jacquard card, and means for controlling the perforating mechanism, embodying a plurality of elongated parallel elements, forming parts of electrical circuits, a second set of elongated, parallel elements, arranged at an angle to said first set, a measuring device adapted to coöperate with said parallel elements of both sets, to control said electric circuits, and adapted to act upon various portions of said elongated elements, and means controlled by said electric circuits and adapted to cause the operation of the perforating elements, whereby perforations will be made in different positions representing the extent of movement of the measuring device, in moving from one parallel element of a set to another.

41. In a jacquard card punching machine, means for perforating a jacquard card, and means for controlling the perforating mechanism, embodying a plurality of stationary elements, forming parts of electric circuits, a second set of stationary elements, forming parts of other electric circuits, and arranged at an angle to said first set, and a measuring device for measuring distance, and adapted to operate upon the stationary elements of both sets, to control their circuits, means controlled by said circuits, and adapted to cause perforations to be made by the perforating elements in different positions, representing the extent of movement of the measuring device, said stationary elements of each set being arranged in a plurality of groups, and the various stationary elements having similar positions in the several groups of their respective sets, being connected with the same circuits.

42. In a jacquard card punching machine, means for perforating a jacquard card, and means for controlling the perforating mechanism, embodying a plurality of equidistant stationary elements, forming parts of electric circuits, a second set of stationary equidistant elements, forming parts of other electric circuits, and arranged at right angles to said first set, a measuring device adapted to coöperate with said stationary elements to control their circuits, and means controlled by said circuits and adapted to cause perforations to be made by the perforating mechanism in different positions, representing the extent of movement of the measuring device in moving from one said stationary element of a set to another.

43. In a punching machine means for perforating a card, elements for controlling the selection of perforating elements, and a device for measuring distances, and adapted to act upon said controlling elements, and mechanism whereby when said measuring device simultaneously acts upon a plurality of controlling elements, a controlling element so affected will be made inoperative.

44. In a punching machine, means for perforating a card, and means for controlling the operation thereof, comprising a plurality of elements through which the perforating mechanism is controlled, said elements being arranged in proximity to each other, a device for measuring distances, and adapted to control said elements, means whereby certain controlling elements will be placed in condition to be operated by said measuring device, in advance of others, and means whereby the operation of a controlling element may make another of the controlling elements inoperative.

45. In a punching machine, means for perforating a card, and means for controlling the operation thereof, comprising a plurality of elements, through which the perforating mechanism is controlled, said elements being arranged in proximity to each other, a device for measuring distances, and adapted to control said elements, means whereby certain controlling elements will be placed in condition to be operated by said measuring device, previous to others, and operating upon each operation of the punching machine, and means whereby the operation of a controlling element may make another of the controlling elements inoperative during a punching operation.

46. In a punching machine, means for perforating a card, and means for controlling the operation thereof, comprising a plurality of elements through which the perforating mechanism is controlled, said elements being arranged in proximity to each other, a device for measuring distances, and adapted to actuate said elements, means whereby a portion of the controlling elements will be placed in condition to be operated by said measuring device, previous to other controlling elements, in alternate positions therewith, and means whereby the operation of a controlling element of those first placed in condition to be made operative may cause a controlling element of those last affected, to become inoperative.

47. In a punching machine, means for perforating a card, and means for controlling the perforating mechanism to determine the locations of the perforations, embodying a series of elements having definite locations and adapted to cause perforations to be made in different positions on the card, a second series of such elements, for a similar purpose, but adapted to affect different perforating elements, the elements of the second series being disposed at an angle to the elements of said first series, a device for measuring distances, and adapted to affect both series of elements, mechanism for causing juxtaposed elements in each series to be placed in condition to be actuated by said measuring device in advance of each other, and means whereby the operation of an element of a series, of those first placed in condition to be actuated by said measuring device, will cause a juxtaposed element to become inoperative.

48. In a punching machine, means for perforating a card, and means for controlling the punching elements, embodying a plurality of elements forming parts of electric circuits, means operated by said circuits for causing the operation of perforating elements, a device for measuring distances and adapted to actuate said controlling elements, and mechanism whereby if said measuring device simultaneously acts upon a plurality of controlling elements, a circuit in which a controlling element so operated is included, will be made inoperative.

49. In a punching machine, perforating elements, and means for controlling the operations thereof, embodying a series of elements having definite locations forming parts of electric circuits, means whereby said circuits will cause the operation of perforating elements, according to the relative positions of said controlling elements, a second series of controlling elements, forming parts of other electric circuits, arranged at an angle to the elements of said first set, and adapted to control other perforating elements, a device for measuring distances, and adapted to actuate said controlling elements of each series, means for periodically closing said circuits to place them in condition to be actuated by said measuring device, and adapted to close the circuits of adjacent controlling elements of a series, prior to each other, and means whereby the operation of a controlling element in one of the circuits first closed, will make inoperative, the circuit of an adjacent controlling element.

50. In a punching machine, perforating elements, and means for controlling the operation thereof, embodying a plurality of electric circuits, including electromagnets, selecting mechanism adapted to be controlled by said electromagnets, and a device for measuring distances and adapted to actuate the circuits of said magnets, for the purpose of selecting the said perforating elements.

51. In a punching machine, perforating elements and means for controlling the operation thereof, embodying a plurality of elements forming parts of electric circuits, and having definite positions, a second set of elements forming parts of electric circuits, electromagnets actuated by said circuits, selecting mechanism controlled by said magnets, there being a selecting mechanism controlled by the magnets in each set of circuits, and a device adapted to measure distances, and adapted to coöperate with said elements of definite positions, whereby it is adapted to operate said circuits.

52. In a card punching machine, means for perforating a card, and means for controlling the operation thereof, embodying elements forming parts of electric circuits, a device for measuring distances and adapted to coöperate with said elements, to control their several circuits, a selecting mechanism, and electromagnets controlled by said electric circuits, and adapted to control said selecting mechanism, the electric circuits on one side of said magnets being connected in a plurality of groups which groups are connected in the circuits of said controlling elements, one group connecting with controlling elements which are in alternate position with those with which the other group are connected, and mechanism whereby the operation of a circuit connected with one of said groups will cause the circuit of the other group to become inoperative.

53. In a card punching machine, means for perforating a card, and means for controlling the operation thereof, embodying elements forming parts of electric circuits, a device for measuring distances, and adapted to coöperate with said elements to control the several circuits, a selecting mechanism, and electromagnets controlled by said electric circuits and adapted to control said selecting mechanism, the electric circuits on one side of said magnets being connected in a plurality of groups, which groups are connected in the circuits of said controlling elements, one group connecting with controlling elements which are in alternate position with those with which the other group are connected, means for periodically placing the circuits of one group in condition to be operated by said measuring device, in advance of the circuits of the other group, and means whereby the action of a circuit in the first group to be put in operative condition, will cause the circuits of the other group to be inoperative.

54. In a punching machine, devices for perforating a card, and means for determining the operation thereof, embodying revoluble means, through which said perforating mechanism is adapted to be controlled, selecting elements, for determining the movement of said revoluble means, and a device for measuring distances and adapted to actuate said selecting elements.

55. In a punching machine, means for perforating a card, and means for determining the operation thereof, embodying revoluble means, through which said perforating mechanism is adapted to be controlled, selecting elements adapted to determine the movement of said revoluble means according to the different positions of said selecting elements, a plurality of electric circuits including means for controlling said selecting elements, and a device for measuring distances adapted to control said circuits.

56. In a punching machine, means for perforating a card, and means for controlling the same, embodying a revoluble means through which said perforating mechanism is controlled, selecting devices adapted to determine the revolving action of said revolving means, according to the different positions of the selecting elements, and a device for measuring distances, and adapted to actuate said selecting elements.

57. In a punching machine, means for perforating a card, and means for controlling the same, embodying a revoluble means, through which said perforating mechanism is controlled, selecting devices, adapted to determine the revolving action of said revolving means according to the different positions of the selecting elements, means for causing said revolving means to be successively revolved according to the operation of selecting elements, and a device for measuring distances, and adapted to actuate said selecting devices.

58. In a punching machine, means for perforating a card, and means for controlling the operation thereof embodying means adapted to be progressively moved according to the successive operations of the machine to different positions, and adapted to determine the perforating operations, and means for determining the movement thereof, embodying a selecting mechanism, and a device for measuring distances and adapted to control said selecting mechanism.

59. In a punching machine, means for perforating a card and means for controlling the operation thereof, embodying means adapted to be progressively moved according to the successive operations of the machine to different positions and adapted to determine the perforating operations, means for operating the same and means for determining the movements of said progressively operated means, embodying a selecting mechanism, and a device for measuring distances and adapted to control said selecting mechanism.

60. In a punching machine, means for perforating a card, and means for controlling the operation thereof, embodying means adapted to be progressively moved according to the successive operations of the machine to different positions and adapted to determine the perforating operations, means for determining the movements of said progressively operating means embodying a selecting mechanism, means for causing the movement of said progressively operating means according to the successive operations of said selecting mechanism and means for operating the selecting mechanism.

61. In a punching machine, means for perforating a card, and means for controlling the operation thereof, embodying means adapted to be successively moved to different positions, for determining the perforating operation, and including a reciprocatable cam, means for determining the movement of the cam, embodying a selecting mechanism, means for causing the reciprocation of the cam, whereby it will be revolved according to the successive operations of the selecting mechanism, and means for operating the selecting mechanism.

62. In a punching machine, means for perforating a card, means movable varying extents for controlling the perforating operation, returning mechanism therefor, operating mechanism therefor, embodying means movable successively to different positions, selecting mechanism for said last means, adapted to determine the movement thereof, and means for operating said selecting mechanism.

63. In a punching machine, means for perforating a card, means movable progressively in different directions and varying extents for controlling the perforating operation, and operating mechanism therefor, embodying selecting mechanism adapted to determine the movement thereof and means for actuating the selecting mechanism.

64. In a punching machine, means for perforating a card, means movable progressively in different directions and varying extents for controlling the perforating operation, and operating mechanism therefor, embodying selecting elements adapted to determine the movements of said progressively operating means according to the relative positions of said selecting elements and a device for measuring distances and adapted to operate said selecting elements.

65. In a punching machine, means for perforating a card, reciprocatable means adapted to be revolved progressively in different directions, and varying extents, for controlling the perforating operation, means for reciprocating the same and means for controlling the revolving action of said progressively operating means embodying selecting elements adapted to determine the revolving movements thereof according to the relative positions of said selecting elements, and a device for measuring distances and adapted to operate said selecting elements.

66. In a punching machine, means for perforating a card, means movable varying extents for controlling the perforating operation, returning mechanism therefor, operating mechanism therefor, and means for disconnecting said means from its operating means to permit the former to be returned, said operating mechanism embodying means movable successively to different positions, selecting mechanism for said last means, adapted to determine the movements thereof, and means for operating said selecting mechanism.

67. In a punching machine, means for perforating a card, a plurality of means movable varying extents, for controlling the perforating operation, returning mechanism therefor, operating mechanism therefor, mechanism for causing said varying movement devices to be operated alternately by said operating means, said operating mechanism embodying means movable successively to different positions, selecting mechanism for said last means, adapted to determine the movements thereof, and means for operating said selecting mechanism.

68. In a punching machine for perforating a card, a plurality of means movable varying extents, for controlling the perforating operation, mechanism for periodically locking said plurality of means, returning mechanism for returning said controlling means, operating mechanism for said controlling mechanism, mechanism for causing said controlling mechanism to be operated alternately by their said operating mechanism, said operating mechanism embodying means movable successively to different positions, selecting mechanism for said last means, adapted to determine the movements thereof, and means for operating said selecting mechanism.

69. In a punching machine for perforating a card, a plurality of means movable varying extents for controlling the perforating operation, returning mechanism therefor, operating mechanism for said controlling mechanisms, mechanism for causing said controlling mechanisms to be operated alternately by their said operating mechanism, said operating mechanism embodying a reciprocatable and revoluble cam, means for reciprocating said cam and selecting mechanism for determining the revolutions thereof, and means for operating said selecting mechanism.

70. In a punching machine for perforating a card, a plurality of means movably varying extents, for controlling the perforating operation, returning mechanism therefor, operating mechanism for said controlling mechanism, mechanisms for causing said controlling mechanism to be operated alternately by their said operating mechanism, said operating mechanism embodying a reciprocatable and revoluble cam, means for reciprocating said cam and selecting mechanism, for causing the revolution of the cam, in either direction, and means for operating said selecting mechanism.

71. In a punching machine, devices for perforating a card, and means for determining the operation thereof, embodying revoluble means through which said perforating mechanism is adapted to be controlled, a plurality of selecting mechanisms for determining the movements of said revoluble means, a device for measuring distances, and adapted to actuate the selecting mechanisms, and means for causing the selecting mechanisms to be operated alternately by said measuring device.

72. In a punching machine, means for perforating a card and means for controlling the same, embodying a revoluble means through which said perforating mechanism is controlled, a plurality of selecting mechanisms embodying elements for determining the revolving action of said revolving means, according to the different positions of the selecting elements, a device for measuring distances, and adapted to operate said selecting mechanisms and means for causing the selecting mechanisms to be operated alternately by the measuring mechanism.

73. In a punching machine, means for perforating a card, and means for controlling the same, embodying a revoluble means through which said perforating mechanism is controlled, a plurality of selecting mechanisms embodying elements for determining the revolving action of said revoluble means, according to the different positions of selecting elements, means for causing said revolving means to be successively revolved according to the operation of the selecting elements, a device for measuring distances, and adapted to actuate the selecting mechanisms, and means for causing the said selecting mechanisms to be operated alternately by said measuring device.

74. In a punching machine, means for perforating a card, and means for controlling the same, embodying means adapted to be successively moved to different positions, for determining the perforating operation, and means for determining the movements thereof, embodying a plurality of selecting mechanisms, a device for measuring distances and adapted to actuate said selecting mechanisms, and means for causing said selecting mechanisms to be operated alternately by said measuring device.

75. In a punching machine, means for perforating a card, and means for controlling the operation thereof, embodying means adapted to be successively moved to different positions, for determining the perforating operation, means for operating the same, and means for determining the movement thereof, embodying a plurality of selecting mechanisms, a device for measuring distances, and adapted to actuate said selecting mechanisms and means for causing said selecting mechanisms to be alternately actuated by the measuring device.

76. In a punching machine, means for perforating a card, and means for controlling the operation thereof, embodying means adapted to be successively moved to different positions, for determining the perforating operation, means for operating the same and means for determining the movement thereof, embodying a plurality of selecting mechanisms, means for causing the movement of said successively moving means, whereby the latter will be moved according to the successive operations of said selecting mechanisms, means for operating said selecting mechanisms and means for causing said selecting mechanisms to be operated alternately by their operating means.

77. In a punching machine, means for perforating a card, and means for controlling the operation thereof, embodying means adapted to be successively moved to different positions, for determining the perforating operation, and including a reciprocatable cam, means for determining the rotation of the cam, embodying a plurality of selecting mechanisms, means for causing the reciprocation of the cam, whereby it will be revolved according to the successive operations of the selecting mechanisms, means for operating said selecting mechanisms, and means for causing said selecting mechanisms to be operated alternately by their operating means.

78. In a punching machine, means for perforating a card, means movable varying extents for controlling the perforating operation, returning mechanism therefor, operating mechanism therefor, embodying means movable successively to different positions, a plurality of selecting mechanisms for said last means, adapted to determine the movements thereof, means for operating said selecting mechanisms, and means for causing said selecting mechanisms to be operated alternately by their said operating means.

79. In a punching machine, means for perforating a card, means movable varying extents for controlling the perforating operation, returning mechanism therefor, operating mechanism for said controlling means, and means for disconnecting said means and its operating means to permit the former to be returned, said operating mechanism embodying means movable successively to different positions, a plurality of selecting mechanisms for said last means, adapted to determine the movement thereof, means for operating said selecting mechanisms, and means for causing said selecting mechanisms to be alternately operated by their operating means.

80. In a punching machine, means for perforating a card, a plurality of means movable varying extents for controlling the perforating operation, returning mechanism therefor, operating mechanism therefor, mechanism for causing said varying movement devices to be operated alternately by said operating means, said operating mechanism embodying means movable successively to different positions, a plurality of selecting mechanisms for said last means, adapted to determine the movements thereof, a measuring device for operating the selecting mechanisms and means for causing the selecting mechanisms to be operated alternately by said measuring device.

81. In a punching machine for perforating a card, a plurality of means movable varying extents for controlling the perforating operation, returning mechanism therefor, operating mechanism for said controlling mechanisms, mechanisms for causing said controlling mechanisms to be operated alternately by their said operating mechanism, said operating mechanism embodying a reciprocatable and revoluble cam, means for reciprocating said cam and a plurality of selecting mechanisms for determining the revolutions of the cam, a measuring device and means for causing selecting mechanisms to be operated alternately by the measuring device.

82. In a punching machine for perforating a card, a plurality of means movable varying extents, for controlling the perforating operation, returning mechanism therefor, operating mechanism for said controlling mechanisms, mechanism for causing said controlling mechanisms to be operated alternately by their said operating mechanism, said operating mechanism embodying a reciprocatable and revoluble cam, means for reciprocating said cam, and a plurality of selecting mechanisms for causing the revolution of the cam in either direction, a measuring device and means for causing said measuring device to actuate the selecting mechanisms alternately.

83. In a punching machine, devices for perforating a card, and means for determining the operation thereof, embodying revoluble means, through which said perforating mechanism is adapted to be controlled, selecting elements, for determining the movement of said revoluble means, and means for operating said selecting mechanism comprising a plurality of elements forming parts of electric circuits, a device for measuring distances, and adapted to actuate said elements, according to the various positions of said measuring device, and electromagnets in said circuits, adapted to actuate said selecting elements.

84. In a punching machine, means for perforating a card and means for controlling the same, embodying a revoluble means through which said perforating mechanism is controlled, selecting devices adapted to determine the revolving action of said revolving means, according to the different positions of the selecting elements, and means for controlling said selecting mechanism, comprising a plurality of elements forming parts of electric circuits, a device for measuring distances, and adapted to actuate said elements, according to the various positions of said measuring device, and electromagnets in said circuits and adapted to actuate said selecting elements.

85. In a punching machine, means for perforating a card and means for controlling the same, embodying a revoluble means, through which said perforating mechanism is controlled, selecting devices, adapted to determine the revolving action of said revolving means, according to the different positions of the selecting elements, means for causing said revolving means to be successively revolved according to the operation of selecting elements, and means for controlling said selecting mechanism, comprising a plurality of elements forming parts of electric circuits, a device for measuring distances and adapted to actuate said elements, according to the movement of the said measuring device, and electromagnets in said circuits, adapted to actuate said selecting elements.

86. In a punching machine, means for perforating a card, and means for controlling the operation thereof, embodying means adapted to be successively moved to different positions, for determining the perforating operation, and means for determining the movement thereof, embodying a selecting mechanism, and means for operating said selecting mechanism, comprising a plurality of elements forming parts of electric circuits, a device for measuring distances and adapted to actuate said elements according to the movements of said measuring device, and electromagnets in said circuits, adapted to actuate said selecting elements.

87. In a punching machine, means for perforating a card, and means for controlling the operation thereof, embodying means adapted to be successively moved to different positions, for determining the perforating operation, means for operating the same, and means for determining the movement thereof, embodying a selecting mechanism, and means for controlling said selecting mechanism, comprising a plurality of elements forming parts of electric circuits, a device for measuring distances and adapted to actuate said elements, according to the movements of said measuring device, and electromagnets in said circuits, adapted to actuate said selecting elements.

88. In a punching machine, means for perforating a card, and means for controlling the operation thereof, embodying means adapted to be successively moved to different positions for determining the perforating operation, means for determining the movement thereof, embodying a selecting mechanism, means for causing the movement of said means for moving to different positions, according to the successive operations of said selecting mechanism, and means for operating said selecting mechanism, comprising a plurality of elements forming parts of electric circuits, a device for measuring distances, and adapted to actuate said elements, according to the movements of said measuring device, and electromagnets in said circuits, adapted to actuate said selecting elements.

89. In a punching machine, means for perforating a card, and means for controlling the operation thereof, embodying means adapted to be successively moved to different positions, for determining the perforating operation, and including a reciprocatable cam, means for determining the movement of the cam, embodying a selecting mechanism, means for causing the reciprocation of the cam, whereby it will be revolved according to the successive operations of the selecting mechanism, and means for controlling said selecting mechanism, comprising a plurality of elements forming parts of electric circuits, a device for measuring distances and adapted to actuate said elements, according to the movements of said measuring device, and electromagnets in said circuits, adapted to actuate said selecting elements.

90. In a punching machine, means for perforating a card, means movable varying extents for controlling the perforating operation, returning mechanism therefor, operating mechanism therefor, embodying means movable successively to different positions, selecting mechanism for said last means, adapted to determine the movements thereof, and means for controlling said selecting mechanism, comprising a plurality of elements forming parts of electric circuits, a device for measuring distances and adapted to actuate said elements, according to the movements of said measuring device, and electromagnets in said circuits, adapted to actuate said selecting elements.

91. In a punching machine, means for perforating a card, means movable varying extents for controlling the perforating mechanism, and means for disconnecting said means from its operating means, to permit the former to be returned, said operating mechanism embodying means movable successively to different positions, selecting mechanism, for said last means, adapted to determine the movement thereof, and means for controlling said selecting mechanism, comprising a plurality of elements forming parts of electric circuits, a device for measuring distances and adapted to actuate said elements according to the movements of said measuring device, and electromagnets in said circuits adapted to actuate said selecting elements.

92. In a punching machine, means for perforating a card, a plurality of means movable varying extents, for controlling the perforating operation, returning mechanism therefor, operating mechanism therefor, mechanism for causing said varying movement devices to be operated alternately by said operating means, said operating mechanism embodying means movable successively to different positions, selecting mechanism for said last means, adapted to determine the movements thereof, and means for operating said selecting mechanism, comprising a plurality of elements forming parts of electric circuits, a device for measuring distances and adapted to actuate said elements, according to the movements of said measuring device, and electromagnets in said circuits, adapted to actuate said selecting elements.

93. In a punching machine for perforating a card, a plurality of means movable varying extents, for controlling the perforating operation, returning mechanism therefor, operating mechanism for said controlling mechanisms, mechanism for causing said controlling mechanisms to be operated alternately by their said operating mechanism, said operating mechanism embodying a reciprocatable and revoluble cam, means for reciprocating said cam, and selecting mechanism for causing the revolution of the cam in either direction, and means for controlling said selecting mechanism, comprising a plurality of elements forming parts of electric circuits, a device for measuring distances, and adapted to actuate said elements, according to the movements of said measuring device and electromagnets in said circuits, adapted to actuate said selecting elements.

94. In a punching machine, devices for perforating a card, and means for determining the operation thereof, embodying revoluble means through which said perforating mechanism is adapted to be controlled, a plurality of selecting mechanisms for determining the movements of said revoluble means, and means for controlling the selecting mechanisms comprising a plurality of elements forming parts of electric circuits, a device for measuring distances, and adapted to actuate said elements, according to the movements of said measuring device, and electromagnets in said circuits adapted to actuate said selecting elements and means for causing the selecting mechanisms to be operated alternately by their said operating means.

95. In a punching machine, means for perforating a card, and means for controlling the same, embodying a revoluble means, through which said perforating mechanism is controlled, a plurality of selecting mechanisms, embodying elements for determining the revolving action of said revolving means according to the different positions of the selecting elements, and means for operating said selecting mechanisms comprising a plurality of elements forming parts of electric circuits, a device for measuring distances and adapted to actuate said elements, according to the movements of said measuring device, and electromagnets in said circuits, adapted to actuate said selecting elements, and means for causing the selecting mechanisms to be operated alternately by their said operating means.

96. In a punching machine, means for perforating a card, and means for controlling the same, embodying a revoluble means, through which said perforating mechanism is controlled a plurality of selecting mechanisms embodying elements for determining the revolving action of said revoluble means, according to the different positions of selecting elements, means for causing said revolving means to be successively revolved according to the operation of the selecting elements, and means for controlling said selecting mechanisms comprising a plurality of elements forming parts of electric circuits, a device for measuring distances and adapted to actuate said elements according to the movements of said measuring device, and electromagnets in said circuits, adapted to actuate said selecting elements, and means for causing the selecting mechanisms to be operated alternately by their said operating means.

97. In a punching machine, means for perforating a card, and means for controlling the same, embodying means adapted to be successively moved to different positions, for determining the perforating operation, and means for determining the movements thereof, embodying a plurality of selecting mechanisms, and means for controlling said selecting mechanisms, comprising a plurality of elements forming parts of electric circuits, a device for measuring distances and adapted to actuate said elements, according to the movements of said measuring device, and electromagnets in said circuits, adapted to actuate said selecting elements, and means for causing the selecting mechanisms to be operated alternately by their said operating means.

98. In a punching machine, means for perforating a card, and means for controlling the operation thereof, embodying means adapted to be successively moved to different positions, for determining the perforating operation, and including a reciprocatable cam, means for determining the rotation of the cam, embodying a plurality of selecting mechanisms, means for causing the reciprocation of the cam, whereby it will be revolved according to the successive operations of the selecting mechanisms, means for controlling said selecting mechanisms, comprising a plurality of elements, forming parts of circuits, a device for measuring distances, and adapted to actuate said elements, according to the movements of said measuring device, and electromagnets in said circuits adapted to actuate said selecting elements, and means for causing the mechanisms to be operated alternately by their said operating means.

99. In a punching machine, means for perforating a card, means movable varying extents for controlling the perforating operation, returning mechanism therefor, operating mechanism therefor, embodying means movable successively to different positions, a plurality of selecting mechanisms for said last means, adapted to determine the movements thereof, and means for controlling said selecting mechanisms comprising a plurality of elements forming parts of electric circuits, a device for measuring distances, and adapted to actuate said elements, according to the movements of said measuring device, and electromagnets in said circuits, adapted to actuate said selecting elements, and means for causing the selecting mechanisms to be operated alternately by their said operating means.

100. In a punching machine for perforating a card, a plurality of means movable varying extents, for controlling the perforating operation, returning mechanism therefor, operating mechanism for said controlling mechanisms, mechanisms for causing said controlling mechanisms to be operated alternately by their said operating mechanism, said operating mechanism embodying a reciprocatable and revoluble cam, means for reciprocating said cam and a plurality of selecting mechanisms for determining the revolutions of the cam, and means for controlling said selecting mechanisms, comprising a plurality of elements forming parts of electric circuits, a device for measuring distances and adapted to actuate said elements, according to the movements of said measuring device, and electromagnets in said circuits, adapted to actuate said selecting elements, and means for causing the selecting mechanisms to be operated alternately by their said operating means.

101. In a jacquard card punching machine, means for perforating a jacquard card, and means for controlling the perforating mechanism, embodying a plurality of elements having definite positions relative to the movements of the pointing device, a pointing device adapted to select from said elements of definite positions and means operated independently of said pointing device, adapted to effect the operation of the perforating mechanism, according to the selection of said elements of definite position made by said pointing device.

Signed at the city, county and State of New York, this 30th day of June 1911.

JOSEPH A. GROEBLI.

Witnesses:
Wm. G. Miller,
Henry Egli.

Copies of this patent may be obtained for five cents each, by addressing the "Commissioner of Patents, Washington, D. C."